US006259743B1

(12) United States Patent
Garth

(10) Patent No.: US 6,259,743 B1
(45) Date of Patent: Jul. 10, 2001

(54) AUTOMATIC CONSTELLATION PHASE RECOVERY IN BLIND START-UP OF A DUAL MODE CAP-QAM RECEIVER

(75) Inventor: Lee McCandless Garth, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/110,081

(22) Filed: Jul. 2, 1998

(51) Int. Cl.⁷ ......................................................... H04L 5/12
(52) U.S. Cl. ........................... 375/261; 375/222; 375/342; 709/260
(58) Field of Search ....................... 375/261, 222, 375/342; 709/229, 260; 370/524, 276

(56) References Cited

U.S. PATENT DOCUMENTS

| | | | |
|---|---|---|---|
| 4,227,152 | * 10/1980 | Godard et al. | 375/13 |
| 5,809,074 | * 9/1998 | Werner et al. | 375/233 |
| 5,835,731 | * 11/1998 | Werner et al. | 375/235 |
| 6,088,389 | * 7/2000 | Larson | 375/231 |
| 6,101,217 | * 8/2000 | Gut | 375/222 |

OTHER PUBLICATIONS

Neil K. Jablon, C.W. Farrow, and Shao–Ning Chou, Timing recovery for blind Equalization, 1988, Maple press,p.p. 112–118.*

Neil k. Jablon, Joint Blind Equalization, Carrier Recovery, and Timing Recovery for High–Order QAM Signal Constellations, Jun. 1992, IEEE vol. 40 No. 6, p.p. 1383–1398.*

* cited by examiner

*Primary Examiner*—Stephen Chin
*Assistant Examiner*—Tony Al-Beshrawi
(74) *Attorney, Agent, or Firm*—Joseph J. Opalach

(57) ABSTRACT

A dual-mode receiver uses a hybrid cost function that provides for automatic constellation phase recovery regardless of whether a CAP signal or a QAM signal has been transmitted. In one embodiment, the receiver uses a hybrid cost function that is the superposition of a QAM-based cost function and a CAP-based cost function. In another embodiment, the receiver comprises an adaptive filter that alternates between a QAM-based cost function and a CAP-based cost function. In addition, a method is described that uses information about (a) the expected constellations, and (b) the values before and after a rotator of the receiver for deciding what type of signal is being received.

77 Claims, 15 Drawing Sheets

IDEALIZED QAM TRANSCEIVER STRUCTURE

CONVENTIONAL CAP TRANSCEIVER STRUCTURE

PASSBAND QAM TRANSCEIVER STRUCTURE

FIG. 8
(PRIOR ART)
DECISION DIRECTED EQUALIZER STRUCTURES
CAP EQUALIZER:
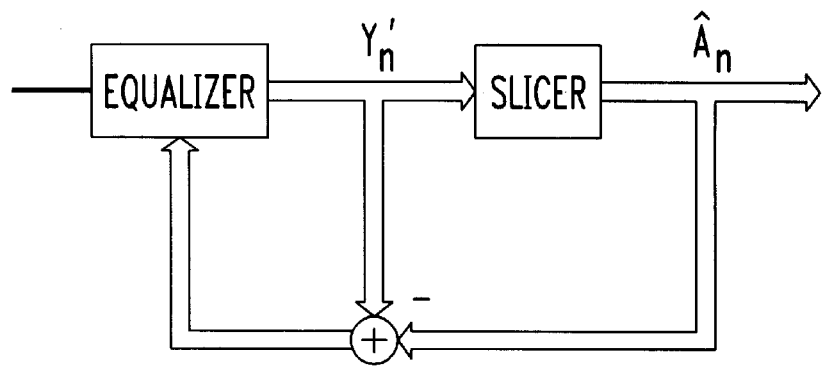
QAM EQUALIZER:
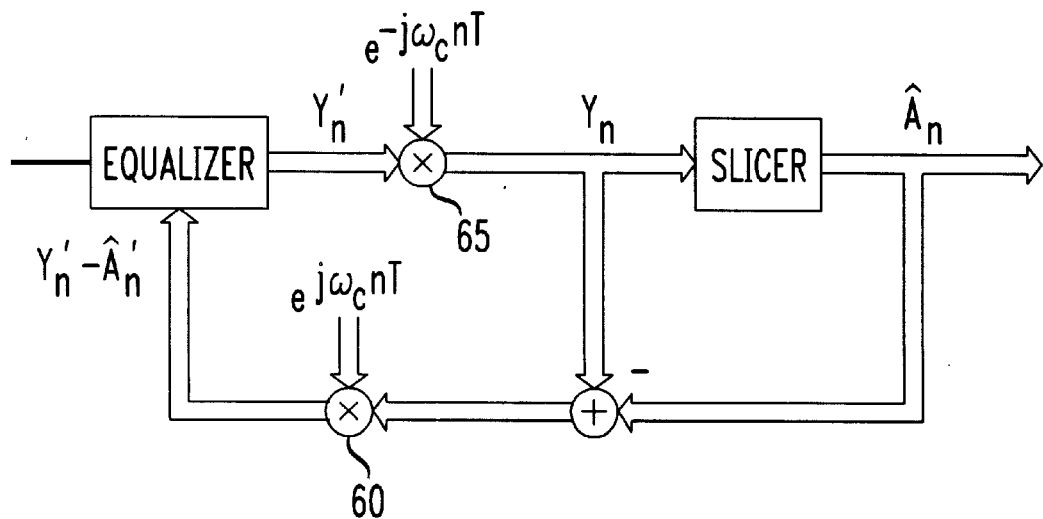

FIG. 10
(PRIOR ART)
BLIND EQUALIZER STRUCTURES
CAP EQUALIZER:
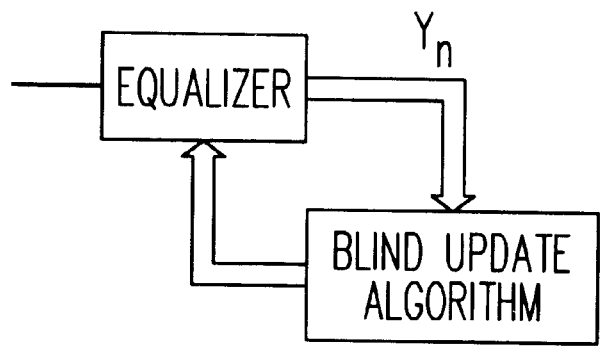
QAM EQUALIZER:
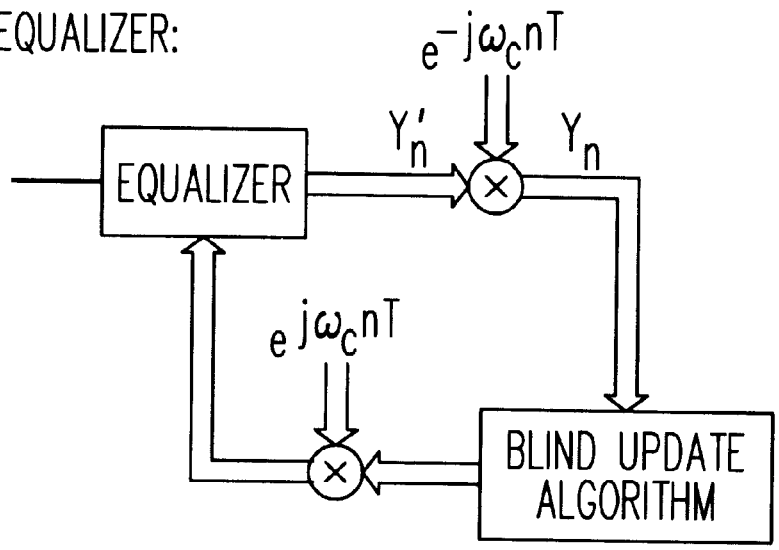

FIG. 11
CAP-BASED RECEPTION OF QAM
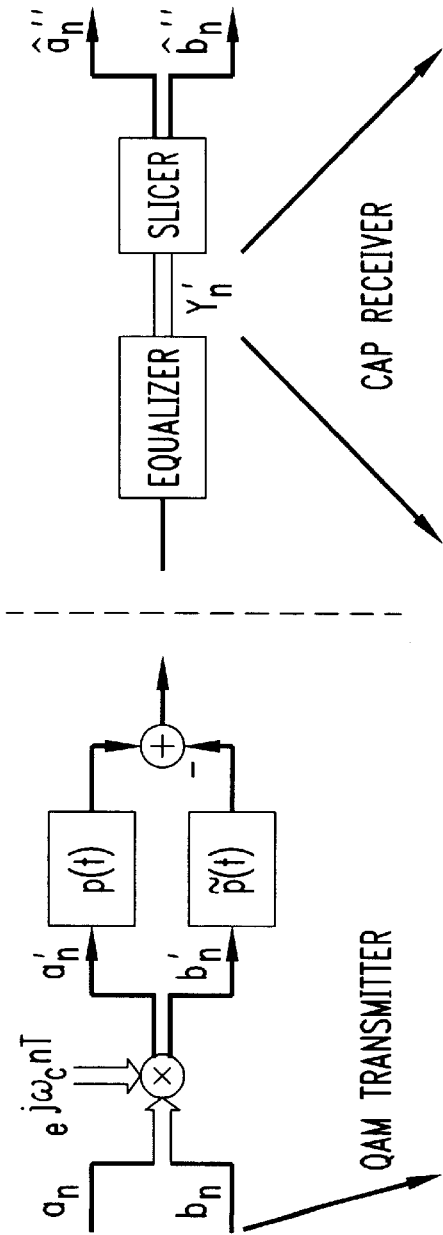
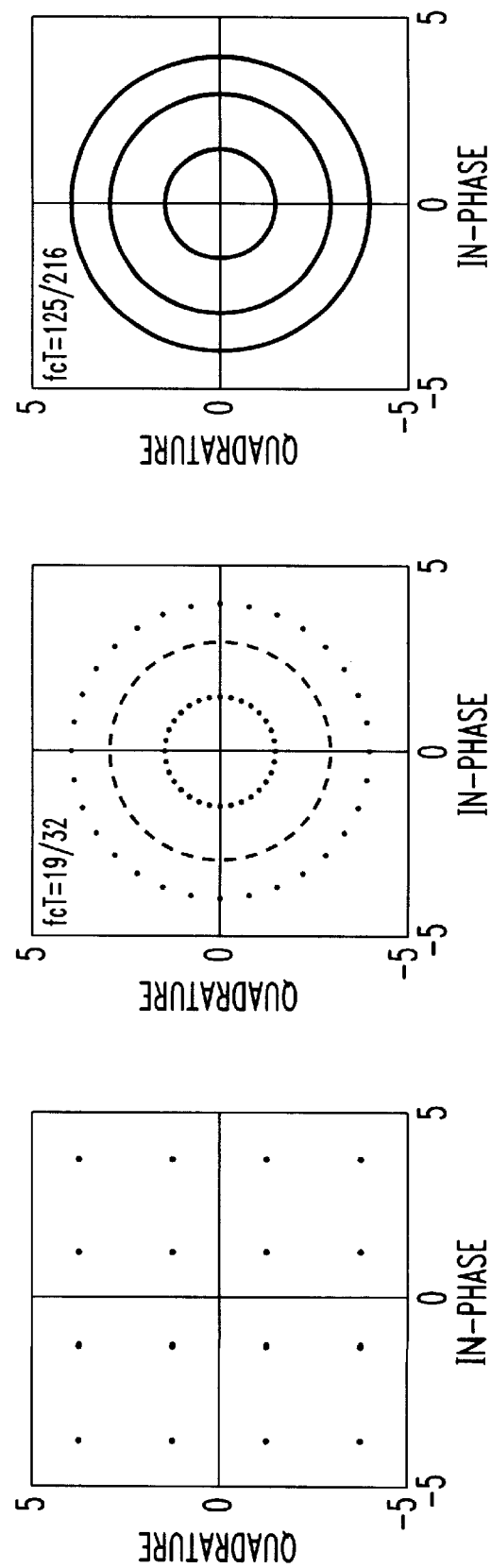

FIG. 12

MISMATCHED BLIND EQUALIZATION

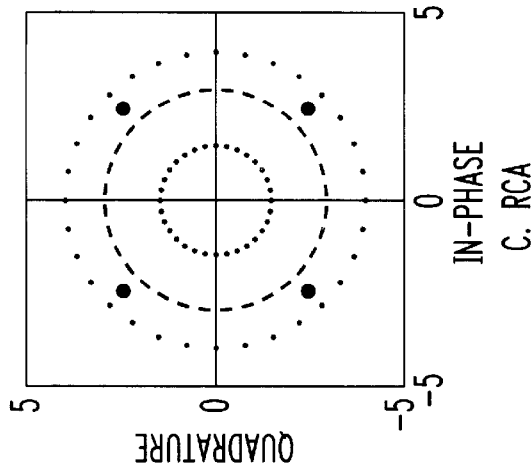

a. CMA

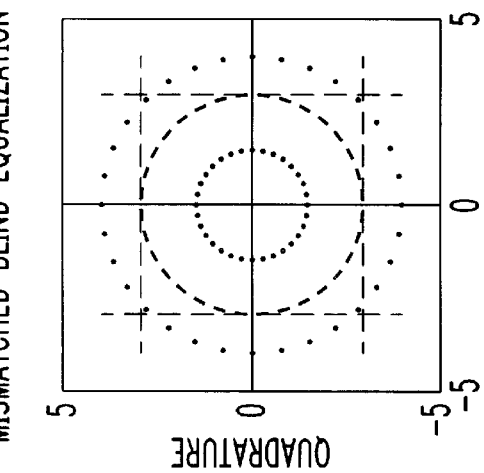

b. MMA

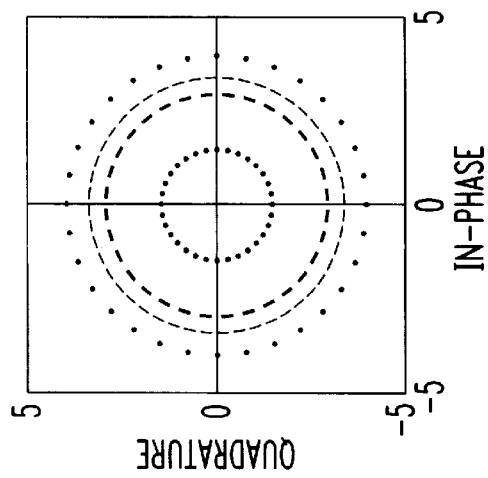

c. RCA

NOTE: THE THREE CONSTANTS R HAVE DIFFERENT VALUES

| BLIND EQUALIZATION ALGORITHM | COST FUNCTION | GEOMETRICAL FIT |
|---|---|---|
| CONSTANT MODULUS ALGORITHM (CMA): | $CF_{CMA} = E\{(|Y'_n|^L - R^L)^2\}$ | CIRCLES TO A CIRCLE |
| MULTIMODULUS ALGORITHM (MMA): | $CF_{MMA} = E\{(|y'_n|^L - R^L)^2 + (|\tilde{y}'_n|^L - R^L)^2\}$ | CIRCLES TO A SQUARE |
| REDUCED CONSTELLATION ALGORITHM (RCA): | $CF_{RCA} = E\{|Y'_n - R \operatorname{csgn}(Y'_n)|^2\}$ | CIRCLES TO FOUR POINTS |

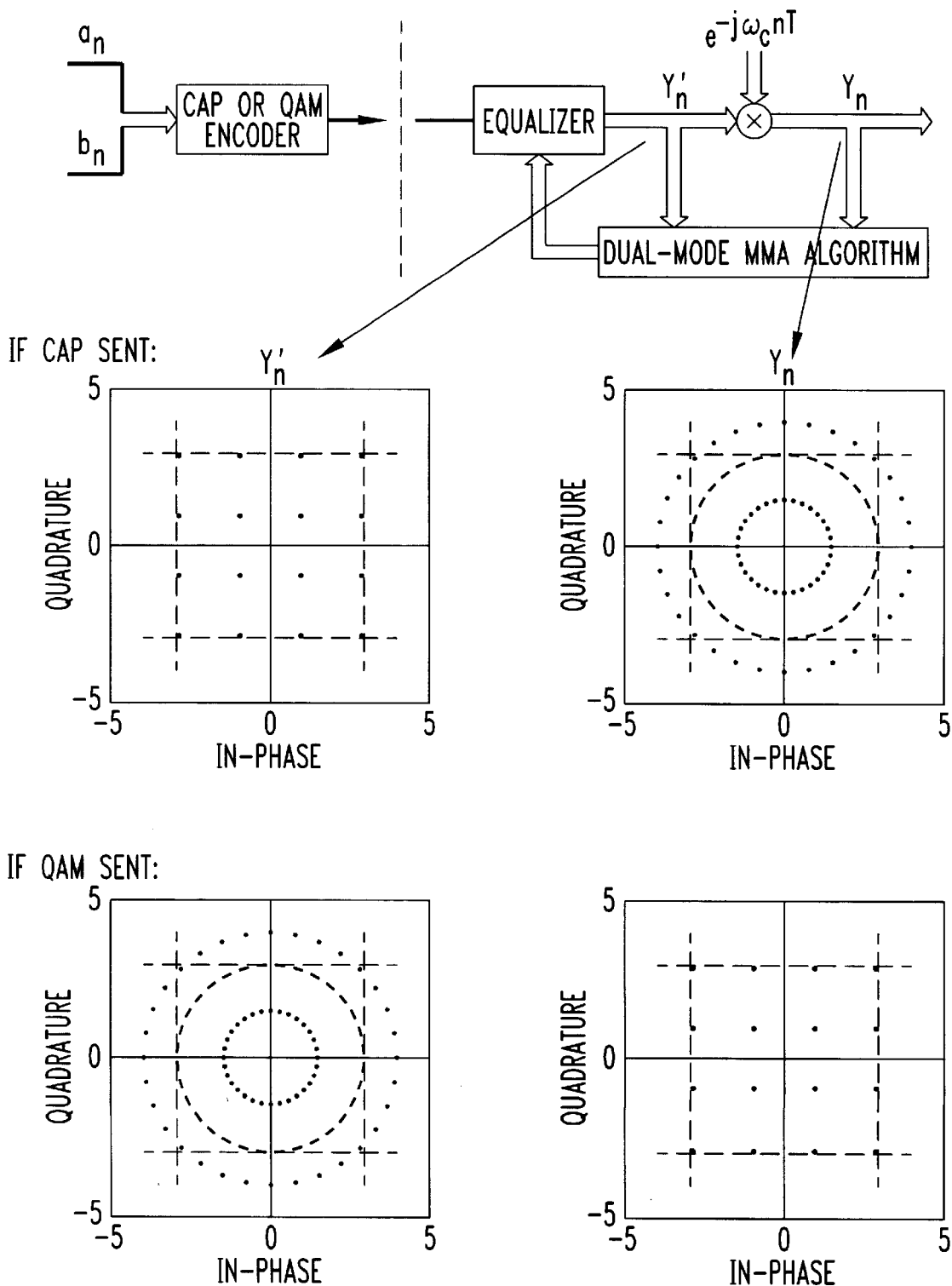

FIG. 18
200  CAP-QAM RECEIVER (MMA)
STEP 910 OF FIG. 17
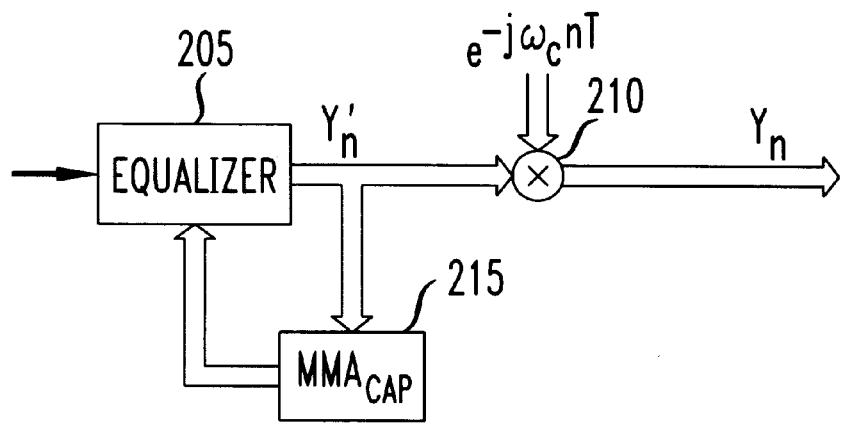
STEP 920 OF FIG. 17
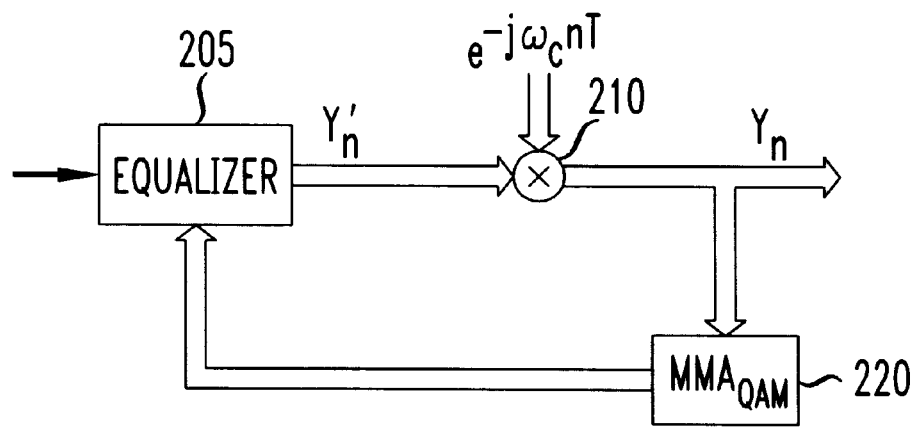

ized encoding where a complex symbol, $A_n$, is
AUTOMATIC CONSTELLATION PHASE RECOVERY IN BLIND START-UP OF A DUAL MODE CAP-QAM RECEIVER

CROSS-REFERENCE TO RELATED APPLICATIONS

Related subject matter is disclosed in the co-pending, commonly assigned, U.S. patent application of Werner et al., entitled "Blind Start-Up Of A Dual Mode CAP-QAM Receiver," Ser. No. 09/109,364, filed on even date herewith.

FIELD OF THE INVENTION

The present invention relates to communications equipment, and, more particularly, to the use of blind equalization in a receiver.

BACKGROUND OF THE INVENTION

Carrierless amplitude modulation/phase modulation (CAP) is a bandwidth-efficient two-dimensional passband line code. (Additional information on a CAP communications system can be found in J. J. Werner, "Tutorial on Carrierless AM/PM—Part I—Fundamentals and Digital CAP Transmitter," *Contribution to ANSI X3T9.5 TP/PMD Working Group*, Minneapolis, Jun. 23, 1992.) CAP is closely related to the more familiar quadrature amplitude modulation (QAM) transmission scheme. In voiceband modems, QAM has been used for over 25 years, while CAP has been used for over 15 years. However, CAP is simpler to implement digitally. Illustrative prior art transceiver structures for the QAM and CAP transmission schemes are shown in FIGS. 1 and 2, respectively. Both FIGS. 1 and 2 illustrate two-dimensional encoding where a complex symbol, $A_n$, is applied to the transmitter portion (where $A_n=a_n+jb_n$), and a recovered complex symbol, $\hat{A}_n$, is provided by the receiver portion, where $\hat{A}_n=\hat{a}_n+j\hat{b}_n$. With respect to other notation used in these FIGS., g(t) (e.g., see FIG. 1) is the impulse response of a baseband shaping filter, $e_{in}(t)$ and $e_{qu}(t)$ are equalizers for the in-phase and quadrature components, respectively, and p(t) and $\tilde{p}(t)$ are impulse responses of a passband shaping filter which form a Hilbert pair (e.g., see FIG. 2).

To observe the difference between QAM and CAP transceivers, notice in FIG. 1 that the conventional QAM transmitter consists of a baseband pulse shaping filter followed by a modulator. The idealized QAM receiver for the case of no intersymbol interference (ISI) and additive Gaussian noise inverts these operations first using a demodulator and then a matched filter. An equivalent representation of the QAM transceiver is shown in FIG. 3, where the filtering and modulation operations have been reversed. This is known as the passband representation because the filtering is done at passband. To compensate for ISI, the matched filter has been replaced by an equalizer. Finally, removing the modulator and demodulator in FIG. 3 yields the CAP transceiver of FIG. 2, which attains the same theoretical performance as QAM but is simpler to implement digitally.

Currently, some broadband access applications, such as VDSL (Very high rate Digital Subscriber Line), may require either a CAP receiver or a QAM receiver. Some in the art have proposed simply putting both the CAP receiver and the QAM receiver into one receiver—in effect having a dual structure receiver with a CAP section (having its own equalizer) and a separate QAM section (with its own equalizer). To further complicate matters, this dual structure receiver may require the use of blind equalization techniques in both the QAM section and the CAP section. In this case, there is no training signal for the dual structure receiver to use to identify the type of modulation. As such, the dual structure receiver must first independently converge both the equalizer in the QAM section and the equalizer in the CAP section, and then make a decision as to the type of modulation before switching to the correct steady state operating mode.

An alternative approach is described in the above-referenced U.S. patent application of Werner et al., entitled "Blind Start-Up Of A Dual Mode CAP-QAM Receiver." In this approach, a receiver utilizes a single equalizer for supporting both a CAP mode of operation and a QAM mode of operation.

SUMMARY OF THE INVENTION

The receiver structure described in the above-referenced U.S. Patent application of Werner et al., entitled "Blind Start-Up Of A Dual Mode CAP-QAM Receiver" may require the use of an additional constellation phase compensator for correct decoding of a QAM signal. However, I have realized that this receiver structure can be further improved to eliminate the additional phase compensator. In particular, and in accordance with the invention, a dual-mode receiver uses a hybrid cost function that provides for automatic constellation phase recovery regardless of whether a CAP signal or a QAM signal has been transmitted.

In an embodiment of the invention, a receiver comprises an adaptive filter that utilizes a combined cost function during blind start-up. This combined cost function is the superposition of a cost function based on one type of received signal, e.g., QAM, with a cost function based on another type of received signal, e.g., CAP.

In another embodiment of the invention, a receiver comprises an adaptive filter that alternates between a cost function based on one type of received signal, e.g., QAM, and a cost function based on another type of received signal, e.g., CAP.

In accordance with a feature of the invention, a method is described that uses information about (a) the expected constellations, and (b) the values before and after a rotator of the receiver for deciding what type of signal is being received.

BRIEF DESCRIPTION OF THE DRAWING

FIG. 8 shows illustrative prior art decision-directed structures for receiving a CAP signal and a QAM signal;

FIG. 10 shows illustrative prior art updating structures for a CAP equalizer and a QAM equalizer;

FIGS. 11–13 illustrate CAP-based reception of a QAM signal in certain situations;

FIG. 15 illustrates the operation of a hybrid cost function in accordance with the principles of the invention;

FIG. 18 shows another embodiment in accordance with the inventive concept;

DETAILED DESCRIPTION

Figure 1:
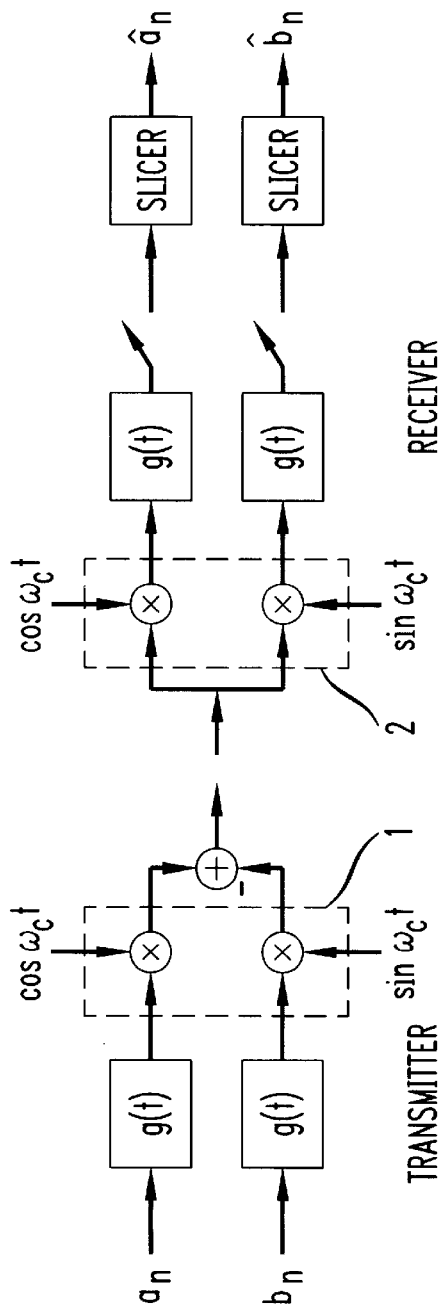
FIG. 1 is a block diagram of a prior art baseband QAM transceiver.
Figure 2:
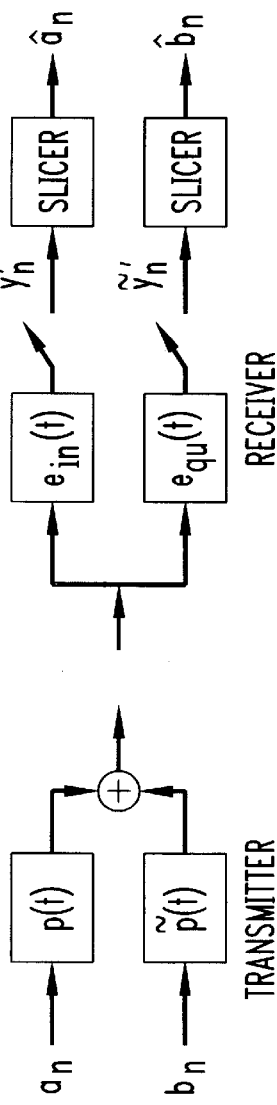
FIG. 2 is a block diagram of a prior art CAP transceiver.
Figure 3:
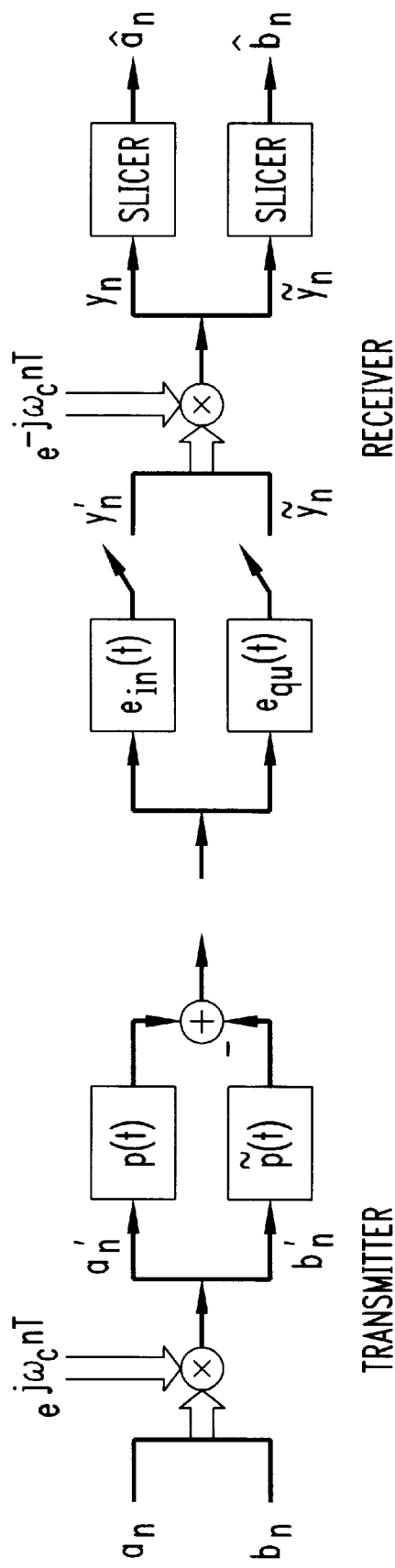
FIG. 3 is a block diagram of a prior art passband QAM transceiver.
Figure 4:
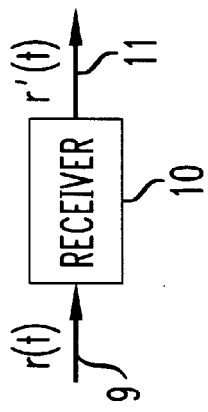
FIG. 4 is an illustrative block diagram of a portion of a communications system embodying the principles of the invention.

An illustrative high-level block diagram of a portion of a communications system embodying the principles of the invention is shown in FIG. 4. For illustrative purposes only, it is assumed that receiver 10 receives either a CAP signal or a QAM signal. It is assumed that the CAP or QAM signal has been distorted while propagating through communications channel 9 and experiences intersymbol interference (ISI). The purpose of receiver 10 is to remove the ISI and minimize the effect of any additive noise $\xi(t)$ to provide signal r'(t). The inventive concept will illustratively be described in the context of a receiver that (a) has a dual mode of operation (a CAP mode and a QAM mode), and (b) only uses a single equalizer for both the CAP mode of operation and the QAM mode of operation.

Figure 5:
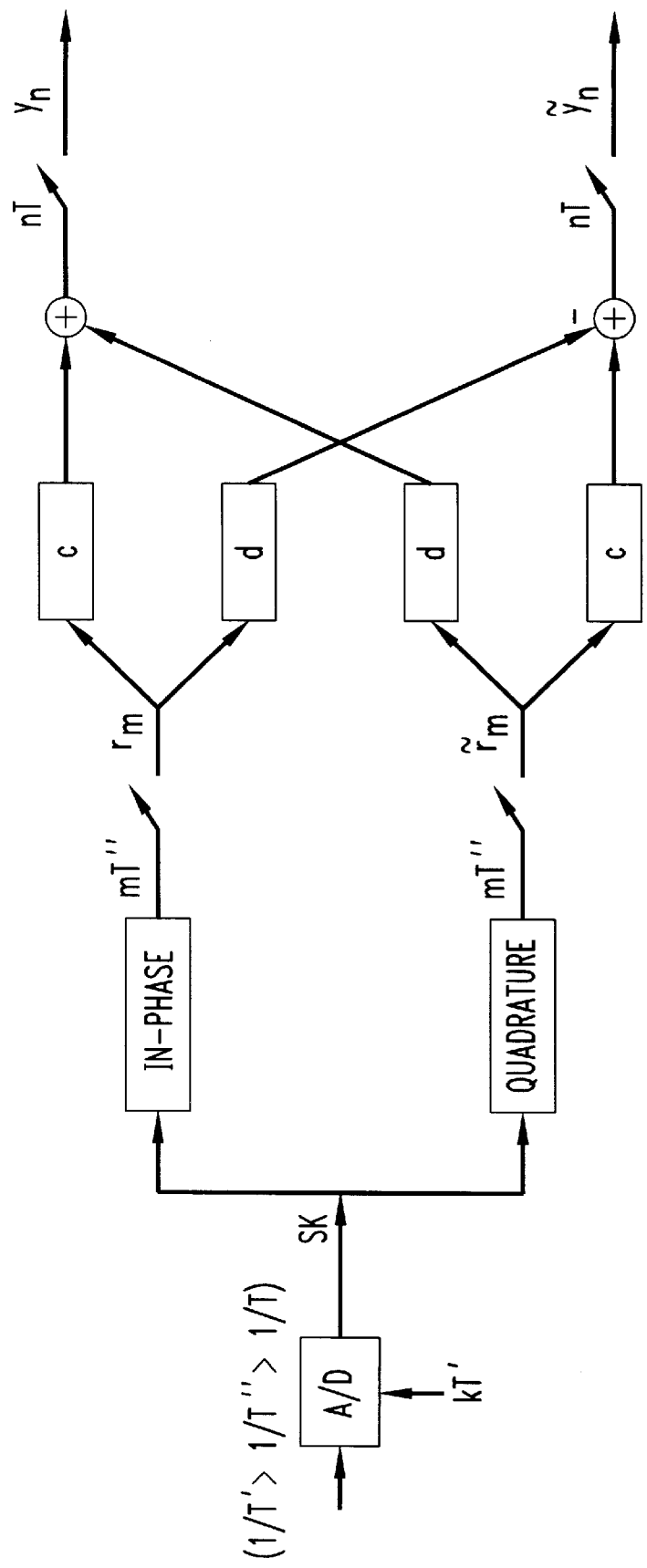
FIG. 5 shows an illustrative block diagram of a prior art cross-coupled equalizer.

However, before describing the inventive concept, some background information on adaptive filters is presented. Also, as used herein, an adaptive filter is, e.g., a fractionally spaced linear equalizer, which is hereafter simply referred to as an FSLE or, simply, an equalizer. Further, the term "single equalizer structure" encompasses an adaptive filter for equalizing a received signal. As known in the art, this equalizer structure, or adaptive filter, itself may comprise other filters for different components, or combinations, of the received signal. For example, a "single equalizer structure" is a traditional complex equalizer (also known as the cross-coupled equalizer) shown in FIG. 5, which comprises four filters; or a phase-splitting equalizer shown in FIG. 6, which comprises two filters, etc.

Adaptive Filters and Decision-Directed Equalization

Figure 6:
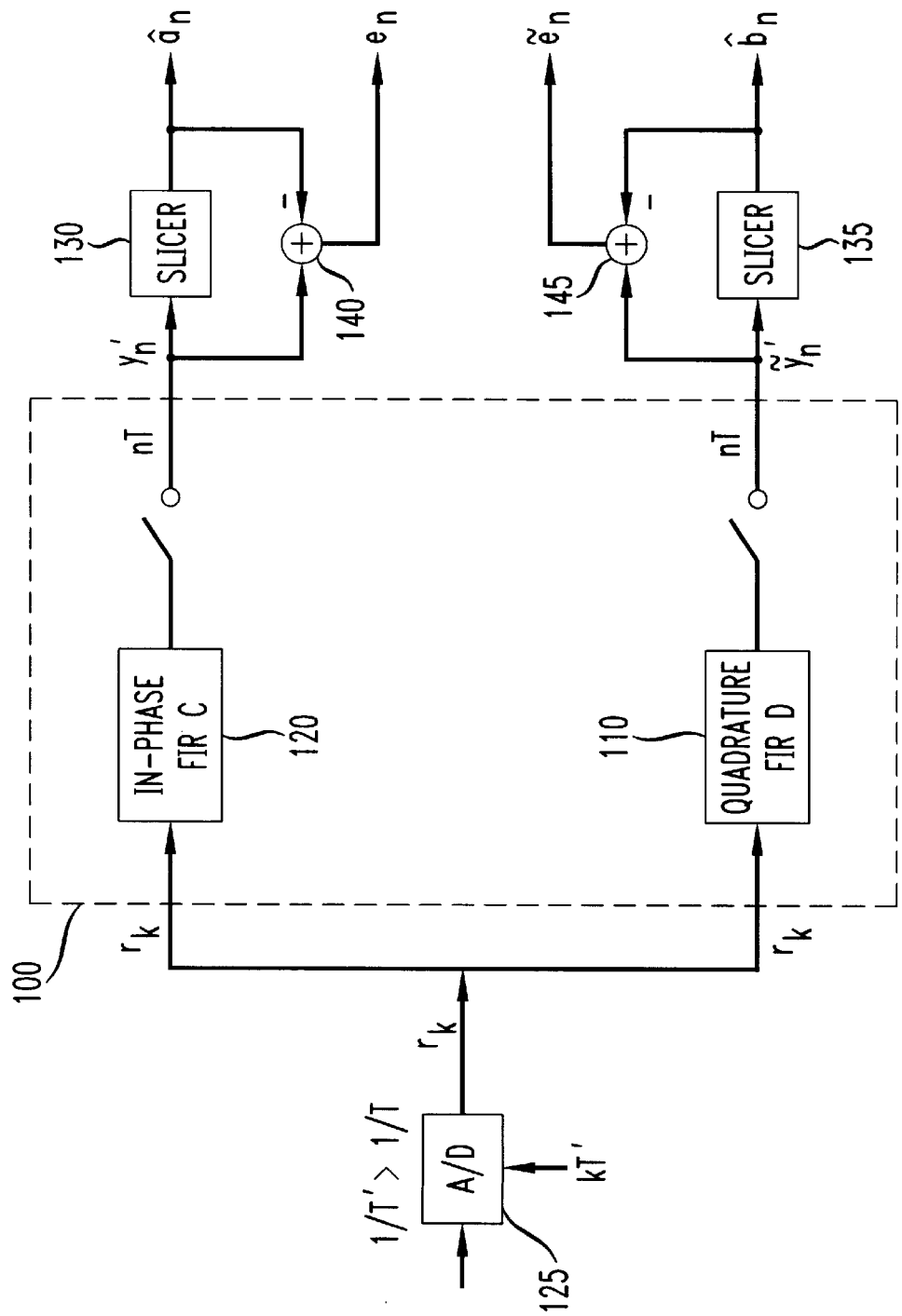
FIG. 6 is an illustrative block diagram of a prior art phase-splitting equalizer.
Figure 7:
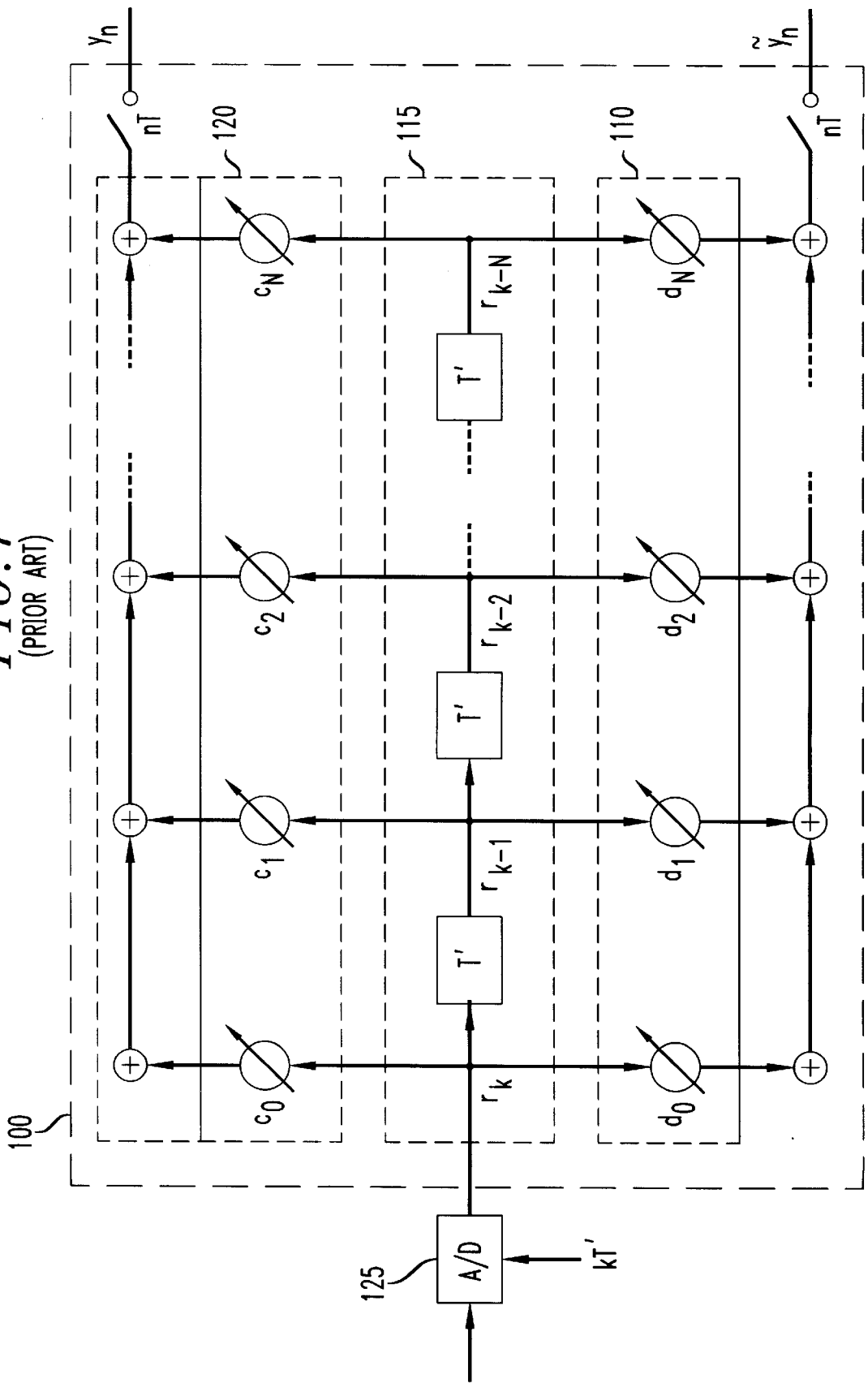
FIG. 7 is an illustrative block diagram of a portion of a prior art adaptive filter for use in an equalizer.

An illustrative phase-splitting FSLE equalizer 100 for the reception of a CAP signal is shown in FIG. 6. It is assumed that FSLE equalizer 100 operates on an input signal that can be characterized as having N dimensions. In this example, N=2, i.e., the input signal comprises two component dimensions: an in-phase component and a quadrature component. FSLE equalizer 100 comprises two parallel digital adaptive filters implemented as finite impulse response (FIR) filters 110 and 120. Some illustrative details of the equalizer structure are shown in FIG. 7. The two FIR filters 110 and 120 share the same tapped delay line 115, which stores sequences of successive Analog-to-Digital Converter (A/D) 125 samples $r_k$. The sampling rate 1/T' of A/D 125 is typically three to four times higher than the symbol rate 1/T and is chosen in such a way that it satisfies the sampling theorem for real signals. It is assumed that T/T'=i, where i is an integer.

The outputs of the two adaptive FIR filters 110 and 120 as shown in FIG. 7 are computed at the symbol rate 1/T. The equalizer taps and input samples can be represented by a corresponding N-dimensional vector. As such, the following relationships are now defined:

$r_n^T=[r_k, r_{k-1}, \ldots, r_{k-N}]$=vector of A/D samples in delay line; (1)

$c_n^T=[c_0, c_1, c_2, \ldots, c_N]$=vector of in-phase tap coefficients; a(2)

$d_n^T=[d_0, d_1, d_2, \ldots, d_N]$=vector of quadrature phase tap coefficients; (3)

where the superscript T denotes vector transpose, the subscript n refers to the symbol period nT, and k=(i)(n).

For the CAP-based phase-splitting equalizer, let $y'_n$ and $\tilde{y}'_n$ be the computed outputs of the in-phase and quadrature filters, respectively, and:

$y'_n=c_n^T r_n$; and (4)

$\tilde{y}'_n=d_n^T r_n$. (5)

An X/Y display of the outputs $y'_n$ and $\tilde{y}'_n$ or, equivalently, of the complex output $Y'_n=y'_n+j\tilde{y}'_n$, is called a signal constellation. After convergence, ideally the signal constellation consists of a display of the complex symbols $A_n=a_n+jb_n$ corrupted by some small noise and ISI.

Referring back to FIG. 6, FSLE equalizer 100 for the reception of a CAP signal can be characterized as having two modes of operation, a decision-directed mode (steady state) and a start-up mode (non-steady state). In the decision-directed mode of operation, the decision devices, i.e., slicers 130 and 135, compare the equalizer complex output samples, $Y'_n$, with all the possible transmitted complex symbols, $A_n$, and select the symbol $\hat{A}_n$ which is the closest to $Y'_n$. The receiver then computes an error, $E_n$, where:

$E'_n=e'_n+j\tilde{e}'_n=Y'_n-\hat{A}_n$, (6)

which is used to update the tap coefficients of equalizer 100. The most common tap updating algorithm is the LMS algorithm, which is a stochastic gradient algorithm that minimizes the mean square error (MSE), which is defined as:

$MSE(Y'_n) \triangleq E[|E'_n|^2]=E[|Y'_n-\hat{A}_n|^2]=E[e'^2_n]+E[\tilde{e}'^2_n]$. (7)

In equation (7), E[.] denotes expectation and $e'_n$ and $\tilde{e}'_n$ are the following in-phase and quadrature errors:

$e'_n=y'_n-\hat{a}_n$, and (8)

$\tilde{e}'_n=\tilde{y}'_n-\hat{b}_n$. (9)

For the CAP line code, the tap coefficients of the two adaptive filters of the phase-splitting equalizer are updated using the above-mentioned least-mean-square (LMS) algorithm, i.e., $c_{n+1}=c_n-\alpha e'_n r_n$, and (10)

$d_{n+1}=d_n-\alpha \tilde{e}'_n r_n$, (11)

where $\alpha$ is the step size used in the tap adjustment algorithm.

A higher level representation of a decision-directed equalizer for CAP signals is shown in FIG. 8. As also shown in FIG. 8, for a QAM signal the decision-directed equalizer includes a complex rotator (65) between the adaptive filters and the slicer. The error $E_n=Y_n-\hat{A}_n$ is modulated back to passband by rotator (60) before being used to update the filter coefficients. For a QAM signal, the filters of a phase splitting equalizer are updated using the LMS algorithm as follows:

$$c_{n+1}=c_n-\alpha \text{Re}[(Y_n-\hat{A}_n)e^{j\omega_c nT}]r_n^T=c_n-\alpha \text{Re}(Y'_n-\hat{A}'_n)r_n^T \quad (12)$$

$$d_{n+1}=d_n-\alpha \text{Im}[(Y_n-\hat{A}_n)e^{j\omega_c nT}]r_n^T=d_n-\alpha \text{Im}(Y'_n-\hat{A}'_n)r_n^T, \quad (13)$$

where $Y'_n=Y_n e^{j\omega_c nT}$, $\hat{A}'_n=\hat{A}_n e^{j\omega_c nT}$, and Re() and Im() denote the real and imaginary parts, respectively.

Blind Equalization and Constellation Phase Recovery

In contrast to the steady state mode of operation, the start-up mode is used to converge the tap coefficient values to an initial set of values. In some systems a training sequence (i.e., a predefined sequence of $A_n$ symbols) is used during start-up, from which the receiver can compute meaningful errors $E_n$ by using the equalizer output signal $Y_n$ and the known sequence of transmitted symbols $A_n$. In this case, tap adaptation is said to be done with respect to an "ideal reference."

However, when no training sequence is available, equalizer 100 has to be converged blindly. First, a blind equalization algorithm is used to open the "eye diagram." Then, once the eye is open enough, the receiver switches to, e.g., the above-described LMS tap adaptation algorithm. The philosophy of blind equalization is to use a tap adaptation algorithm that minimizes a cost function that is better suited to provide initial convergence of equalizer 100 than the MSE represented by equation (7).

Although there are a number of blind equalization techniques known in the art, only three general approaches are discussed herein. One is referred to herein as the "reduced constellation algorithm" (RCA) (e.g., see Y. Sato, "A Method of Self-Recovering Equalization for Multilevel Amplitude-Modulation Systems," *IEEE Trans. Commun.*, pp. 679–682, June 1975; and U.S. Pat. No. 4,227,152, issued Oct. 7, 1980 to Godard); another technique is the so-called "constant modulus algorithm" (CMA) (e.g., see D. N. Godard, "Self-Recovering Equalization and Carrier Tracking in Two-Dimensional Data Communications Systems," IEEE Trans. Commun., vol. 28, no. 11, pp. 1867–1875, November 1980; and N. K. Jablon, "Joint Blind Equalization, Carrier Recovery, and Timing Recovery for High-Order QAM Signal Constellations", *IEEE Trans. Signal Processing*, vol. 40, no. 6, pp. 1383–1398, 1992); and the final technique is referred to as the "multimodulus algorithm" (MMA) (e.g., see Yang, J. and Werner, J. J., *The Multimodulus Blind Equalization Algorithms*, Proceedings of DSP97, Santorini, Greece, 1997).

Figure 9:
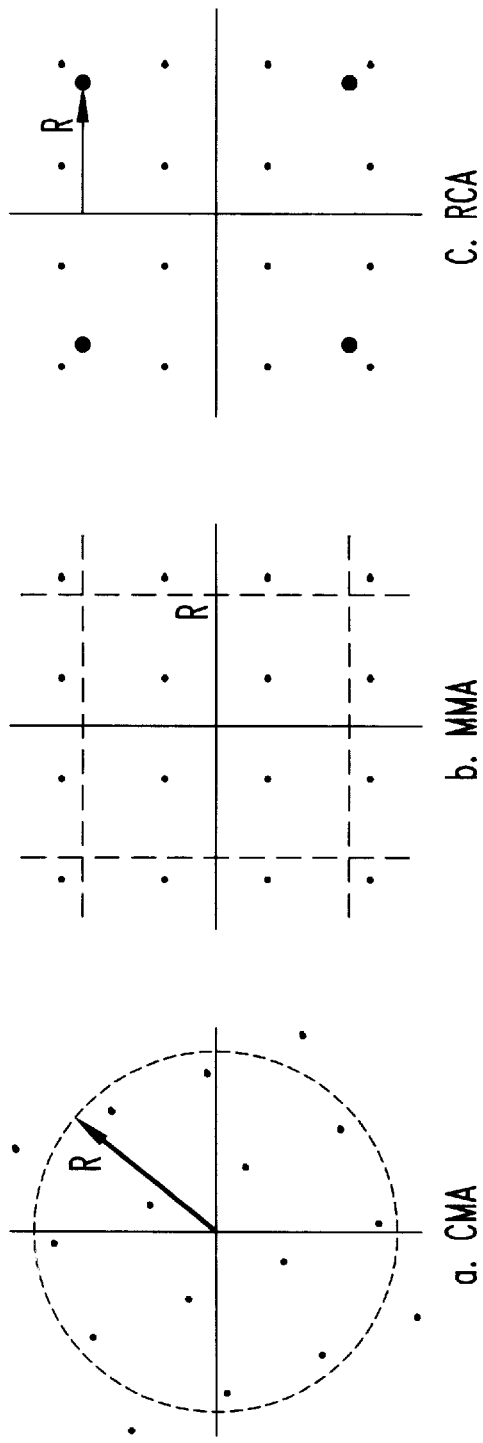
FIG. 9 shows a summary of three prior art blind equalization approaches.

FIG. 9 shows a graphical representation of the cost functions from which CMA, MMA, and RCA are derived. As shown in FIG. 9a, CMA attempts to fit a square signal constellation to a circle. The corresponding cost function is $$CF_{CMA}(Y_n)=E\{(|Y_n|^L-R^L)^2\}, \quad (14)$$

where L is most often chosen to be 2. For L=2 this cost function is invariant to a phase rotation because $|Y_n e^{j\phi}|^2=|Y_n|^2$. Thus, an additional constellation phase compensator is required to properly align a square equalizer output constellation to the X and Y axes before sending outputs $Y_n$ into the slicer.

MMA and RCA, on the other hand, are not invariant to a constellation phase rotation. Minimizing their respective cost function will lead to proper alignment (modulo 90°) of a square equalizer output constellation with the X and Y axes. Thus, an additional phase compensator is not required. As shown in FIG. 9b, MMA tries to fit a square signal constellation to a square contour with cost function $$CF_{MMA}(Y_n)=E\{(|y_n|^L-R^L)^2+(|\tilde{y}_n|^L-R^L)^2\}, \quad (15)$$

where L is most often chosen to be 2. Similarly, as shown in FIG. 9c, RCA attempts to fit the constellation to a reduced set of four points at the vertices of a square with cost function $$CF_{RCA}(Y_n)=E\{|Y_n-\text{Rc sgn}(Y_n)|^2\}, \quad (16)$$

with c $\text{sgn}(Y_n)=\text{sgn}(y_n)+j\ \text{sgn}(\tilde{y}_n)$, where sgn ( ) is the signum function.

As further background, the LMS update equations for MMA and RCA are provided below. As an example, the update equations for the phase splitting FSLE implemented for CAP and QAM signals using the traditional structures is shown in FIG. 10. For MMA (L=2), the filter coefficient update equations for a CAP signal attempting to minimize $CF_{MMA}(Y'_n)$ are:

$$c_{n+1}=c_n-\alpha(y'_n{}^2-R^2)y'_n r_n^T \quad (17)$$

$$d_{n+1}=d_n-\alpha(\tilde{y}'_n{}^2-R^2)\tilde{y}'_n r_n^T. \quad (18)$$

The analogous equations for a QAM signal trying to minimize $CF_{MMA}(Y_n)$ are:

$$c_{n+1}=c_n-\alpha[(y_n^2-R^2)y_n \cos(\omega_c nT)-(\tilde{y}_n^2-R^2)\tilde{y}_n \sin(\omega_c nT)]r_n^T. \quad (19)$$

$$d_{n+1}=d_n-\alpha[(y_n^2-R^2)y_n \sin(\omega_c nT)+(\tilde{y}_n^2-R^2)\tilde{y}_n \cos(\omega_c nT)]r_n^T. \quad (20)$$

For RCA, the filter coefficient update equations for a CAP signal attempting to minimize $CF_{RCA}(Y'_n)$ are:

$$c_{n+1}=c_n-\alpha[y'_n-R\ \text{sgn}(y'_n)]r_n^T \quad (21)$$

$$d_{n+1}=d_n-\alpha[\tilde{y}'_n-R\ \text{sgn}(\tilde{y}'_n)]r_n^T. \quad (22)$$

The analogous equations for a QAM signal trying to minimize $CF_{RCA}(Y_n)$ are:

$$c_{n+1}=c_n-\alpha[(y_n-R\ \text{sgn}(y_n))\cos(\omega_c nT)-(\tilde{y}_n-R\ \text{sgn}(\tilde{y}_n))\sin(\omega_c nT)](23)$$

$$d_{n+1}=d_n-\alpha[(y_n-R\ \text{sgn}(y_n))\sin(\omega_c nT)+(\tilde{y}_n-R\ \text{sgn}(\tilde{y}_n))\cos(\omega_c nT)](24)$$

Mismatched CAP-Based Reception of a QAM Signal

Figure 13:
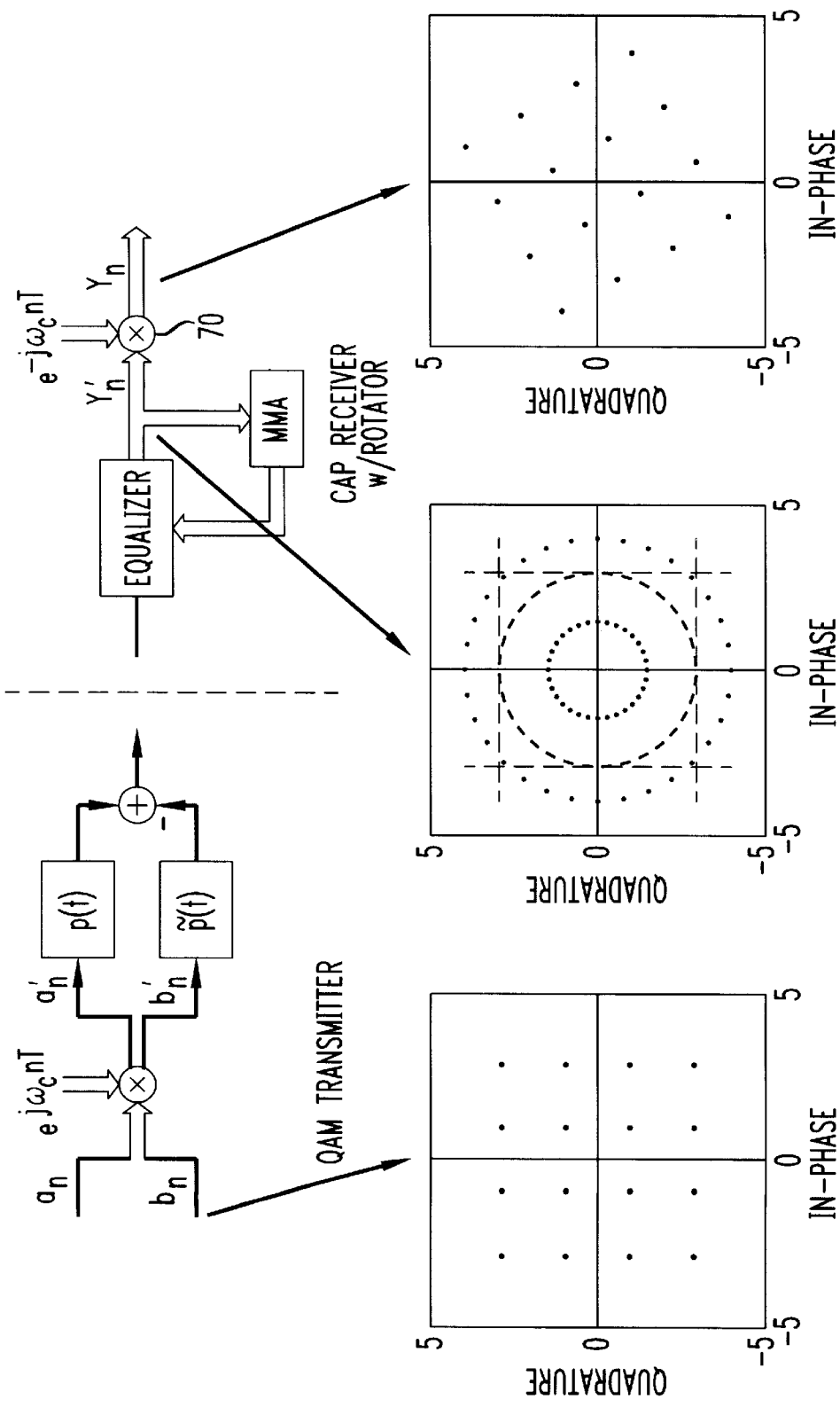

In the above-mentioned U.S. patent application of Werner et al., entitled "Blind Start-up of a Dual Mode CAP-QAM Receiver," it is demonstrated that a single equalizer-based CAP receiver can be used to decode a QAM signal. This scenario is shown in FIG. 11. Without a rotator in the CAP receiver, if the QAM symbols are selected from a square constellation, the outputs of the equalizer, upon convergence, will belong to concentric circles as shown in FIG. 11 for two different values of $f_c T$. Thus, if a blind algorithm such as CMA, MMA or RCA is used to converge the equalizer taps, it will be operating on circular symbol constellations as shown in FIG. 12 (as opposed to square ones as shown in FIG. 9). Even though MMA and RCA can successfully open the eye in this case, due to the invariance of circular constellations to phase rotation about the origin (this is approximate for the discrete case), both algorithms lose their constellation phase recovery properties. Consider as an example the reception of a QAM signal using the apparatus proposed in the above-mentioned patent application of Werner et al., which is shown in FIG. 13. If the equalizer is converged by applying MMA to the equalizer outputs, the eye is successfully opened. However, the act of fitting a square to a circle makes it unlikely that the QAM symbol constellation will be correctly oriented after rotator (70).

Dual Mode CAP-QAM Receiver

I have designed a single equalizer-based receiver that is capable of opening the "eye" for both CAP and QAM signals and that has the additional property of yielding the correct constellation orientation before or after the rotator. In particular, and in accordance with the invention, a dual-mode receiver uses a hybrid cost function that provides for automatic phase recovery. This hybrid cost function is also referred to herein as a "dual-mode cost function." In accordance with the inventive concept, the basic method for forming the dual-mode cost function is to combine the single-mode CAP and QAM cost functions on either side of the rotator in a receiver. The hybrid cost function takes advantage of the constellation phase recovery properties of blind algorithms such as MMA and RCA and is used in conjunction with square symbol constellations (described below). In addition, this receiver automatically detects which modulation method is being used and switches to the appropriate decision-directed structure (described below).

Figure 14:
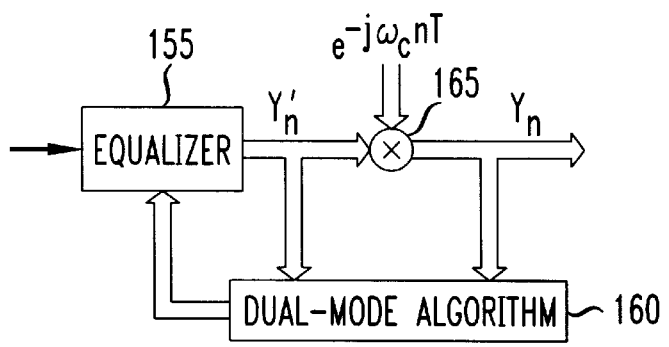
FIG. 14 is an illustrative block diagram of a portion of a receiver embodying the principles of the invention.

In accordance with the inventive concept, a portion 150 of a dual-mode receiver for CAP and QAM, such as receiver 10 of FIG. 4, (also referred to herein as a CAP-QAM receiver) is shown in FIG. 14. Other than the inventive concept, the elements shown in FIG. 14 are well-known and will not be described in detail. Receiver portion 150 comprises equalizer 155, rotator 165 and dual-mode algorithm element 160. The latter updates the tap coefficient values (not shown) of equalizer 155 as a function of the signal on either side of rotator 165 (described further below). The double lines are representative of a complex signal.

As used herein, $CF^{CAP}$ denotes a blind cost function matched to a CAP signal and processing the equalizer outputs $Y'_n$ before the rotator. For example, the CAP-based RCA cost function is:

$$CF_{RCA}^{CAP} = CF_{RCA}(Y'_n) = E\{|Y'_n - \text{Rc sgn}(Y'_n)|^2\}. \quad (25)$$

Similarly, $CF^{QAM}$ represents a blind cost function matched to a QAM signal and processing the rotator outputs $Y_n$. For example, the QAM-based MMA cost function is:

$$CF_{MMA}^{QAM} = CF_{MMA}(Y_n) = E\{(|y_n|^L - R^L)^2 + (|\tilde{y}_n|^L - R^L)^2\}. \quad (26)$$

FIG. 15 demonstrates the effect of minimizing $CF^{CAP}$ and $CF^{QAM}$ concurrently for the case of MMA in accordance with the invention. If a CAP signal is sent, the "eye" is opened by minimizing both $CF_{MMA}^{CAP}$ and $CF_{MMA}^{QAM}$. Minimizing $CF_{MMA}^{CAP}$ corresponds to fitting the square constellation to a square contour, correctly aligning the CAP constellation ($Y'_n$) with the X and Y axes before the rotator. On the other hand, minimizing $CF_{MMA}^{QAM}$ corresponds to fitting concentric circles of points to a square contour, making the cost function approximately independent of constellation phase orientation. FIG. 15 also shows that the reverse happens for a QAM signal, leading to an open "eye" and correct constellation orientation after the rotator (of $Y_n$).

Once the equalizer has converged, the type of modulation can be determined (as explained below) and the receiver switches to decision-directed mode. Two illustrative methods of minimizing $CF^{CAP}$ and $CF^{QAM}$ are described herein: a superposition method and an alternation method. (It should be noted that although two illustrative methods are described, the inventive concept is not so limited.)

Superposition Method

The superposition method consists of minimizing the sum of the single mode CAP- and QAM-based cost functions. In this context, the dual mode hybrid cost function is represented by:

$$CF^{DM} = CF^{CAP} + CF^{QAM}. \quad (27)$$

The components of the hybrid cost function can be mixed and matched so that, for example, one possible hybrid cost function is:

$$CF^{DM} = CF_{MMA}^{CAP} + CF_{RCA}^{QAM}. \quad (28)$$

A stochastic gradient type algorithm can be used to minimize $CF^{DM}$.

For example, for a hybrid cost function of $CF^{DM} = CF_{MMA}^{CAP} + CF_{MMA}^{QAM}$, the phase-splitting FSLE taps are updated using:

$$c_{n+1} = c_n - \alpha[(y'^2_n - R^2)y'_n + (y_n^2 - R^2)y_n \cos(\omega_c nT) - (\tilde{y}_n^2 - R^2) \tilde{y}_n \sin(\omega_c nT)]r_n^T \quad (29)$$

$$d_{n+1} = d_n - \alpha[(\tilde{y}'^2_n - R^2)\tilde{y}'_n + (y_n^2 - R^2)y_n \sin(\omega_c nT) + (\tilde{y}_n^2 - R^2)\tilde{y}_n \cos(\omega_c nT)]r_n^T. \quad (30)$$

Figure 16:
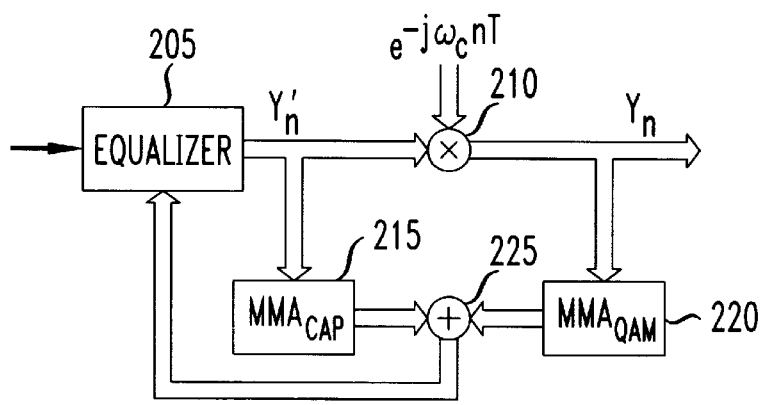
FIG. 16 shows a block diagram illustrating tap updating of an equalizer structure in accordance with the inventive concept.

These update equations are essentially the superposition of equations (17) and (18) with (19) and (20). In accordance with the inventive concept, a portion 200 of a dual mode receiver for CAP and QAM, such as receiver 10 of FIG. 4, (also referred to herein as a CAP-QAM receiver) is shown in FIG. 16. This block diagram illustrates the embodiment of the superposition method in the context of using the MMA algorithm and assuming the use of square constellations. Other than the inventive concept, the elements shown in FIG. 16 are well-known and will not be described in detail. CAP-QAM receiver portion 200 comprises equalizer 205, rotator 210, filter updating elements 215 and 220, and adder 225. For the purposes of this description, it is assumed that equalizer 205 is a single phase-splitting FSLE, but the inventive concept is not so limited.

As noted above, other hybrid cost functions can be formed. For example, $CF^{DM} = CF_{RCA}^{CAP} + CF_{RCA}^{QAM}$ with the equalizer being updated using:

$$c_{n+1} = c_n - \alpha[(y'_n - R \text{ sgn}(y'_n)) + (y_n - R \text{ sgn}(y_n))\cos([|g|]q_c nT) - (\tilde{y}_n - R \text{ sgn}(\tilde{y}_n))\sin(\omega_c nT)]r_n^T \quad (31)$$

$$d_{n+1} = d_n - \alpha[(\tilde{y}'_n - R \text{ sgn}(\tilde{y}'_n)) + (y_n - R \text{ sgn}(y_n))\sin(\omega_c nT) + (\tilde{y}_n - R \text{ sgn}(\tilde{y}_n))\cos(\omega_c nT)]r_n^T, \quad (32)$$

which are formed by combining equations (21) and (22) with (23) and (24). The proper choice of R in these equations is discussed below.

It should be noted that the error components of the coefficient update equations for this superposition method require almost twice as many additions and multiplications as those for the separate CAP and QAM equalizers. If the processor is incapable of performing these additional operations at the symbol rate, two possible solutions exist. Either the tap coefficients of the equalizer can be updates at a rate slower than the symbol rate or the following alternating method can be used. (Unfortunately, both solutions come at the price of a slower equalizer convergence rate.)

Alternation Method

The alternation method is formed by alternating back and forth between minimizing $CF^{CAP}$ and $CF^{QAM}$. We can represent this dual mode cost function as $$CF^{DM}(I)=CF^{CAP} \leftrightarrow CF^{DM}(II)=CF^{QAM}, \qquad (33)$$

where I and II represent alternating time intervals of duration at least as long as the symbol period T. Like the above-described superposition method, the single mode CAP- and QAM-based blind cost functions can be mixed and matched.

Using a stochastic gradient algorithm, if CFDM (I)= $CF_{RCA}{}^{CAP}$ and $CF^{DM}$ (II)=$CF_{RCA}{}^{QAM}$, the phase-splitting FSLE taps are updated alternatively using equations (21) and (22) followed by equations (23) and (24). Similarly, if $CF^{DM}$ (I)=$CF_{MMA}{}^{CAP}$ and $CF^{DM}$ (II)=$CF_{MMA}{}^{QAM}$, the equalizer taps are updated alternatively using equations (17) and (18) followed by equations (19) and (20).

Figure 17:
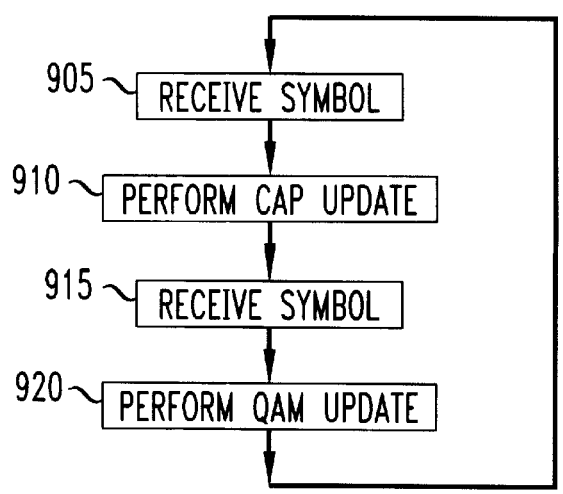
FIG. 17 shows an illustrative flow diagram of a method in accordance with the principles of the invention.

An example of the alternation method is shown in FIG. 17 for MMA. In this illustrative method the single mode cost functions are alternated on a symbol-by-symbol basis. For example, in step 905, of FIG. 17, a first symbol is received. In step 910, the single mode CAP update equations (17) and (18) are executed. For the next symbol, received in step 915, the single mode QAM update equations (19) and (20) are executed in step 920. For the following symbols, the process repeats as shown in FIG. 17. This alternating approach is illustrated in the context of receiver portion 200 as shown in FIG. 18.

It should be noted that this alternating method converges at half the rate of the superposition method. Analogous superposition and alternating methods can be formulated for the cross-coupled equalizer of FIG. 5, using the corresponding update equations. Other variations of the alternating method are possible as well. For example, the equalizer can execute the single mode CAP update equations (17) and (18) k times for each execution of the single mode QAM update equations (19) and (20). This would be particularly applicable in a multipoint to multipoint network where there are k times as many CAP transmitters as QAM transmitters. Similarly, the converse is possible, i.e., executing the single mode QAM update equations k times for each execution of the CAP update equations.

Calculation of Constant R

As noted above, and in accordance with the principles of the invention, the value of the constant R (e.g., see equations (29) and (30)) is a function of the type of blind equalization algorithms used to form the hybrid cost function. Below, illustrative values for R are given for dual mode MMA and RCA blind equalization algorithms. These values of R can be used both in the superposition and alternation methods.

R for Dual Mode MAM

As described above, and in accordance with the inventive concept, a hybrid cost function of a dual-mode receiver using both a QAM-based MMA cost function and a CAP-based MMA cost function resulted in tap update equations (29) and (30) for the superposition method. For these equations it can be shown that the best steady-state $R^L$ is equal to:

$$R^L = \frac{E\{a_n'^{2L} + a_n^{2L}\}}{E\{|a_n'|^L + |a_n|^L\}}, \qquad (34)$$

where we define:

$\hat{A}'_n = \hat{a}'_n + \hat{b}'_n$, and $\hat{A}'_n = \hat{A} e^{j\omega_c nT}$.

Equation (34) assumes that the channel is perfectly inverted by the equalizer, yeilding $Y'_n = A'_n$, and that the symbol streams $\{a_n\}$ and $\{b_n\}$ are independent identically distributed and mutually independent.

For L=2, it can be shown that:

$$R_n^2 = \frac{7E\{a_n^4\} + 3E^2\{a_n^2\}}{8E\{a_n^2\}} + \frac{E\{a_n^4\} - 3E^2\{a_n^2\}}{8E\{a_n^2\}} \cos(4\omega_c nT), \qquad (35)$$

It can be shown that equation (35) can be further simplified by using an average of $R_n{}^2$ over time, which yields:

$$\overline{R^2} = \frac{7E\{a_n^4\} + 3E^2\{a_n^2\}}{8E\{a_n^2\}}. \qquad (36)$$

Computer simulations have shown that this constant $\overline{R^2}$ produces a similar convergence rate and "eye" opening ability as $R_n{}^2$. For a square constellation, equation (36) can be further simplified to:

$$\overline{R^2} = \frac{1}{20}(52m^2 - 27), \qquad (37)$$

where m is the number of symbol levels.

Illustrative average values for $\overline{R^2}$ as a function of m are shown in Table One, below.

TABLE ONE

| m | Constellation Size | $\overline{R^2}$ |
|---|---|---|
| 1 | 4 points | 1.25 |
| 2 | 16 points | 9.05 |
| 4 | 64 points | 40.25 |
| 8 | 256 points | 165.05 |
| 16 | 10244 points | 664.25 |

R for Dual Mode RCA

For dual mode RCA using tap update equations (31) and (32) for the superposition method, it can be shown that:

$$R_n = \frac{E\{a_n'^2 + a_n^2\}}{E\{|a_n'| + |a_n|\}} \qquad (38)$$

$$= \frac{2E\{a_n^2\}}{E\{|a_n \cos(\omega_c nT) - b_n \sin(\omega_c nT)| + |a_n|\}}.$$

This $R_n$ is optimal for both CAP and QAM signals. Due to the nonlinearity of the absolute value, the demominator cannot be expressed directly in terms of the moments of $a_n$. For the square constellation, it can be shown that:

$$R_n = \frac{\frac{2}{3}(4m^2-1)}{m + \frac{1}{4m^2}\sum_{k=1-m}^{m}\sum_{l=1-m}^{m}|(2k-1)\cos(\omega_c nT) - (2l-1)\sin(\omega_c nT)|} \quad (39)$$

If $R_n$ were plotted for m=2 and m=8, (which respectively correspond to 16- and 256-point constellations), it would be observed that $R_n$ oscillates with time. As such, an ad hoc simplification of averaging $R_n$ over n is used, which is denoted herein as $\overline{R}$. Illustration average values for $\overline{R}$ as a function of m are shown in Table Two, below.

TABLE TWO

| m | Constellation Size | $\overline{R}$ |
|---|---|---|
| 1 | 4 points | 1.055 |
| 2 | 16 points | 2.560 |
| 4 | 64 points | 5.334 |
| 8 | 256 points | 10.772 |
| 16 | 10244 points | 21.596 |

Simulations have shown that this function, $\overline{R}$, produces convergence properties similar to $R_n$.

Modulation Type Determination

Figure 19:
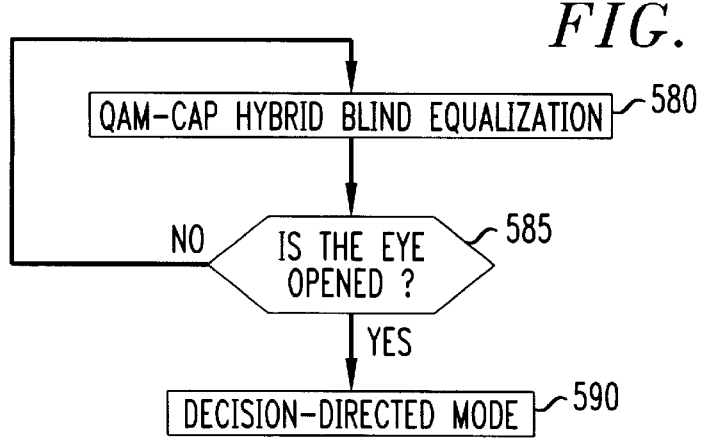
FIG. 19 shows an illustrative blind start-up procedure in accordance with the principles of the invention.

As described, several dual-mode blind equalization algorithms were described. A blind start-up procedure in accordance with the principles of the invention for use in receiver 10 of FIG. 4 is shown in FIG. 19. In step 580, receiver 10 uses CAP-QAM hybrid blind equalization with its corresponding tap updating algorithms to begin blind convergence of an equalizer. In step 585, a decision is made whether to switch from CAP-QAM hybrid blind equalization to the decision-directed mode or to continue using CAP-QAM hybrid blind equalization to converge the equalizer. Typically, this is referred to in the art as determining if the eye is open enough (as noted above). Step 585 of the blind start-up procedure can be schedule-driven, event-driven, or both and is described further below. With a schedule-driven approach, the switch between two different tap updating algorithms occurs after some fixed number, K, of iterations (which can be determined by a counter, for example). This approach presumes a certain amount of eye-opening after K iterations. With an event-driven approach, the switch occurs when a certain quality of eye opening is achieved. This can be done, for example, by continuously monitoring the MSE and making the switch when the MSE is below some threshold S. If the eye has been opened enough, receiver 10 switches to the decision-directed mode in step 590. (It should be noted that the focus of the inventive concept is the use of a single equalizer during blind start-up. As such, once the transition to the decision-directed mode occurs, further updates occur as known in the art. For example, in the QAM mode of operation, an additional rotator may have to be used when updating the equalizer using LMS. Illustrative decision-directed structures are shown in FIG. 8, where $CF_{DD}$ is the decision-directed cost function.)

In order to switch into the decision-directed mode in step 585, and in accordance with the inventive concept, it must be determined whether the received signal is a CAP signal or a QAM signal. For illustrative purposes, an MSE-based method, an MMA-based method, and an RCA-based method, are described further below. It should be noted that the MMA-based method and the RCA-based method use information about (a) the expected constellations, and (b) the values before and after the rotator. The equations shown in these sections can be used for any combination of combined cost function. For example, they are not limited to just using the superposition method cost function $CF_{RCA}{}^{CAP}+CF_{RCA}{}^{QAM}$, they can also be used for $CF_{MMA}{}^{CAP}+CF_{MMA}{}^{QAM}$, $CF_{MMA}{}^{CAP}+CF_{RCA}{}^{QAM}$, etc., These techniques can similarly be used for the alternation technique and its associated cost functions.

MSE-Based Method

One way to decide whether a CAP signal or a QAM signal is being received is to compare estimates of the MSE based upon $Y'_n$ to that of the MSE based upon $Y_n$. If a CAP line code is being transmitted, in steady state the equalizer yields:

$$MSE_{CAP}=E\{(Y'_n-\hat{A}'_n)^2\}<MSE_{QAM}=E\{(Y_n-\hat{A}_n)^2\}. \quad (40)$$

with the inequality reversed for a QAM line code. Here, quantities $\hat{A}'_n$ and $\hat{A}_n$ correspond to sliced versions of $Y'_n$ and $Y_n$. As the MSE will not be known exactly, running sample averages:

$$\overline{MSE}_{CAP} = \frac{1}{\Delta}\sum_{n=n_i+1}^{n_i+\Delta}(y'_n-\hat{a}'_n)^2 + (\tilde{y}'_n-\tilde{b}'_n)^2, \text{ and} \quad (41)$$

$$\overline{MSE}_{QAM} = \frac{1}{\Delta}\sum_{n=n_i+1}^{n_i+\Delta}(y_n-\hat{a}_n)^2 + (\tilde{y}_n-\hat{b}_n)^2. \quad (42)$$

can be used to estimate $MSE_{CAP}$ and $MSE_{QAM}$. As noted above, to decide when to make the transition from blind start-up to decision-directed mode, two methods can be used:

1.) Event-Driven Approach: Decide whether a CAP signal or a QAM signal has been sent when the $\overline{MSE}_{CAP}$ or $\overline{MSE}_{QAM}$, respectively, first falls below an experimentally determined threshold.

2.) Schedule-Driven Approach: At time $nf=n_i+\Delta$, decide that a CAP signal or a QAM signal has been received depending on whether $\overline{MSE}_{CAP}$ or $\overline{MSE}_{QAM}$ is smaller. The decision time, $nf$, is chosen experimentally such that the blind dual-mode algorithm has achieved steady-state operation.

These two approaches can be written in decision-rule form as:

The event driven approach, $\delta_{MSE}{}^{THREESHOD}$:

| If $\overline{MSE}_{QAM}<\tau$ first, then QAM sent, | (43a) |
|---|---|

| If $\overline{MSE}CAP<\tau$ first, then CAP sent. | (43b) |
|---|---|

The schedule-driven approach, $\delta_{MSE}{}^{TIME}$:

| If $\overline{MSE}_{CAP}\geq\overline{MSE}_{QAM}$ at $n=n_f$, then QAM sent, | (44a) |
|---|---|

| If $\overline{MSE}_{CAP}<\overline{MSE}QAM$ at $n=n_f$, then CAP sent. | (44b) |
|---|---|

In practice, a hybrid of the two approaches could also be used, making a comparison of $\overline{MSE}_{CAP}$ or $\overline{MSE}_{QAM}$ at a particular time, if the threshold has not been passed by either quantity. Alternative decision statistics can also be derived from the dual-mode cost functions, potentially leading to computational savings, as follows.

MMA-Based Method

This illustrative method assumes a square symbol constellation with the MMA cost function. In addition, it is assumed that the channel is perfectly inverted by the equalizer, and that the symbol streams $\{a_n\}$ and $\{b_n\}$ are independent identically distributed and mutually independent. The following test is used for $\delta_{MSE}^{TIME}$:

$$\text{If } \overline{CF}_{MMA}^{CAP} \geq \overline{CF}_{MMA}^{QAM} \text{ at } n=n_f, \text{ then QAM sent,} \quad (45a)$$

$$\text{If } \overline{CF}_{MMA}^{CAP} < \overline{CF}_{MMA}^{QAM} \text{ at } n=n_f, \text{ then CAP sent.} \quad (45b)$$

where $CF_{MMA}^{CAP}$ and $CF_{MMA}^{QAM}$ are estimated using the sample averages:

$$\overline{CF}_{MMA}^{CAP} \equiv \frac{1}{\Delta} \sum_{n=n_i+1}^{n_i+\Delta} (|y'_n|^L - R^L)^2 + (|\tilde{y}'_n|^L - R^L)^2, \text{ and} \quad (46)$$

$$\overline{CF}_{MMA}^{QAM} \equiv \frac{1}{\Delta} \sum_{n=n_i+1}^{n_i+\Delta} (|y_n|^L - R^L)^2 + (|\tilde{y}_n|^L - R^L)^2. \quad (47)$$

The fixed threshold approach can also be used to form $\delta_{MMA}^{THRESHOLD}$ analogous to equations (43a).

For L=2, an alternative, simpler, decision rule, is $\delta'_{MSE-TIME}$:

$$\text{If } \overline{TCR}_{MMA}^{CAP} \leq \overline{TCR}_{MMA}^{QAM} \text{ at } n=n_f, \text{ then QAM sent,} \quad (48a)$$

$$\text{If } \overline{TCR}_{MMA}^{CAP} > \overline{TCR}_{MMA}^{QAM} \text{ at } n=n_f, \text{ then CAP sent.} \quad (48b)$$

where estimates of the tricorrelations are $$\overline{TCR}_{MMA}^{CAP} \equiv \frac{1}{\Delta} \sum_{n=n_i+1}^{n_i+\Delta} y'^2_n \tilde{y}'^2_n, \text{ and} \quad (49)$$

$$\overline{TCR}_{MMA}^{QAM} \equiv \frac{1}{\Delta} \sum_{n=n_i+1}^{n_i+\Delta} y^2_n \tilde{y}^2_n. \quad (50)$$

The samples estimates of equations (49) and (50) require half as many multiplies as those in equations (46) and (47).

RCA-Based Method

The constellation phase recovery property of the RCA cost function is used to form the following test, $\delta_{RCA}^{TIME}$:

$$\text{If } \overline{CF}_{RCA}^{CAP} \geq \overline{CF}_{RCA}^{QAM} \text{ at } n=n_f, \text{ then QAM sent,} \quad (51a)$$

$$\text{If } \overline{CF}_{RCA}^{CAP} < \overline{CF}_{RCA}^{QAM} \text{ at } n=n_f, \text{ then CAP sent.} \quad (51a)$$

where $CF_{RCA}^{CAP}$ and $CF_{RCA}^{QAM}$ are estimated using the sample averages:

$$\overline{CF}_{RCA}^{CAP} \equiv \frac{1}{\Delta} \sum_{n=n_i+1}^{n_i+\Delta} (y'_n - R\text{sgn}(y'_n))^2 + (\tilde{y}'_n - R\text{sgn}(\tilde{y}'_n))^2, \text{ and} \quad (52)$$

$$\overline{CF}_{RCA}^{QAM} \equiv \frac{1}{\Delta} \sum_{n=n_i+1}^{n_i+\Delta} (y_n - R\text{sgn}(y_n))^2 + (\tilde{y}_n - R\text{sgn}(\tilde{y}_n))^2. \quad (53)$$

Again, an analogous threshold-based test $\delta_{RCA}^{THRESH-HOLD}$ can be constructed.

For a perfectly equalized channel, a simpler decision rule is, $\delta'_{RCA}^{TIME}$:

$$\text{If } \overline{ABS}_{RCA}^{CAP} \leq \overline{ABS}_{RCA}^{QAM} \text{ at } n=n_f, \text{ then QAM sent,} \quad (54a)$$

$$\text{If } \overline{ABS}_{RCA}^{CAP} > \overline{ABS}_{RCA}^{QAM} \text{ at } n=n_f, \text{ then CAP sent.} \quad (54b)$$

where estimates of the expected absolute values are:

$$\overline{ABS}_{RCA}^{CAP} \equiv \frac{1}{\Delta} \sum_{n=n_i+1}^{n_i+\Delta} |y'_n| + |\tilde{y}'_n|, \text{ and} \quad (55)$$

$$\overline{ABS}_{RCA}^{QAM} \equiv \frac{1}{\Delta} \sum_{n=n_i+1}^{n_i+\Delta} |y_n| + |\tilde{y}_n|. \quad (56)$$

Figure 20:
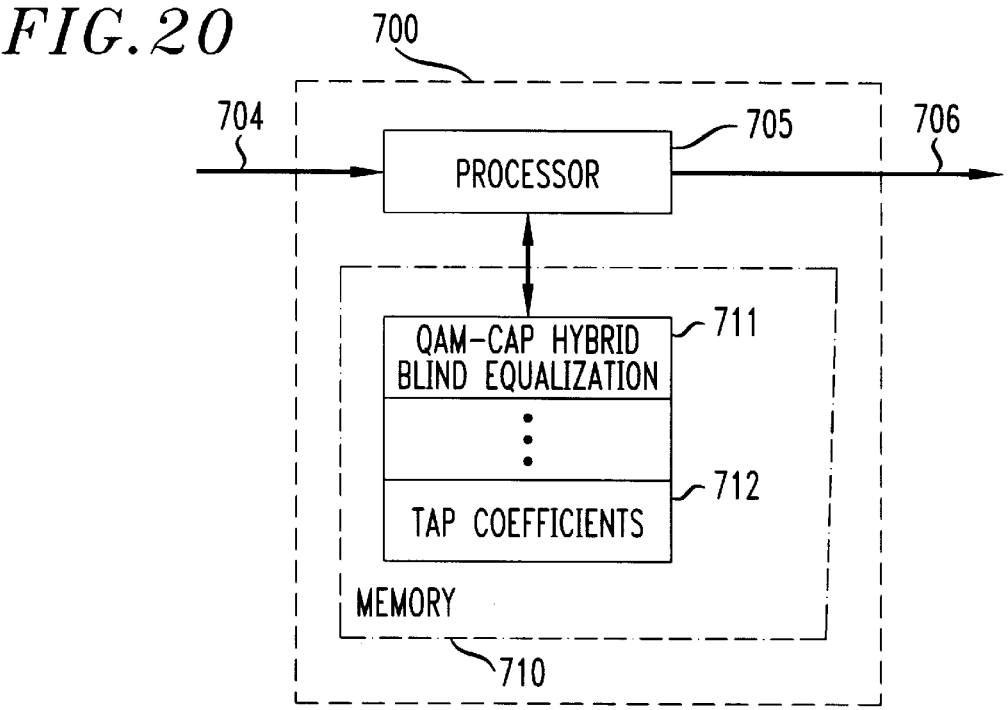
FIGS. 20 and 21 are illustrative block diagrams of a portion of a receiver embodying the principles of the invention.
Figure 21:
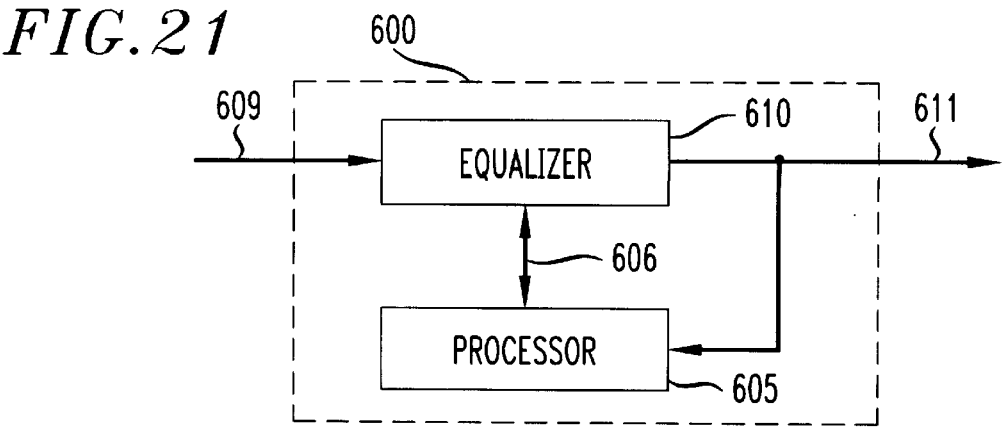

Illustrative embodiments of the inventive concept are shown in FIGS. 20 and 21 for use in receiver 10 of FIG. 4. FIG. 20 illustrates an embodiment representative of a digital signal processor 700 that is programmed to implement an FSLE in accordance with the principles of the invention. Digital signal processor 700 comprises a central processing unit (processor) 705 and memory 710. A portion of memory 710 is used to store program instructions that, when executed by processor 705, implement CAP-QAM hybrid blind equalization (described above). This portion of memory is shown as 711. Another portion of memory, 712, is used to store tap coefficient values that are updated by processor 705 in accordance with the inventive concept. It is assumed that a received signal 704 is applied to processor 705, which equalizes this signal in accordance with the inventive concept to provide a output signal 706, e.g., using the superposition method or the alternating method, or variations thereof. For the purposes of example only, it is assumed that output signal 706 represents a sequence of output samples of an equalizer. (As known in the art, a digital signal processor may, additionally, further process received signal 704 before deriving output signal 706.) An illustrative software program is not described herein since, after learning of the CAP-QAM hybrid blind equalization as described herein, such a program is within the capability of one skilled in the art. Also, it should be noted that any equalizer structures, such as a cross-coupled equalizer, can be implemented by digital signal processor 700 in accordance with the inventive concept.

FIG. 21 illustrates another alternative embodiment of the inventive concept. Circuitry 600 comprises a central processing unit (processor) 605, and an equalizer 610. The latter is illustratively assumed to be a phase-splitting FSLE as described above. It is assumed that equalizer 610 includes at least one tap-coefficient register for storing values for corresponding tap coefficient vectors (e.g., as shown in FIG. 7). Processor 605 includes memory, not shown, similar to memory 710 of FIG. 20 for implementing CAP-QAM hybrid blind equalization. Equalizer output signal 611, which represents a sequence of equalizer output samples, is applied to processor 605. The latter analyzes equalizer output signal 611, in accordance with the inventive concept, to adapt values of the tap coefficients in such a way as to converge to a correct solution, e.g., using the superposition method or the alternating method, or variations thereof.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., equalizer 610, etc., the functions of any one or more of those building blocks can be carried out using one or more appropriately programmed processors or processing circuitry, e.g., a digital signal processor; discrete circuit elements; integrated circuits; etc. In addition, although the inventive concept was described in the context of a single phase-splitting equalizer, other forms of equalizers can also be used.

What is claimed:

1. An improved apparatus for use in receiving a carrierless amplitude modulation/phase modulation (CAP) signal or a quadrature amplitude phase modulation (QAM) signal, the improvement comprising:

a receiver that has a dual mode of operation, a CAP mode and a QAM mode, that utilizes only a single equalizer for both the CAP mode of operation and the QAM mode of operation wherein tap coefficients of the equalizer are updated based upon a hybrid cost function.

2. The improvement of claim 1 wherein the hybrid cost function provides for automatic phase recovery.

3. The improvement of claim 1 wherein the hybrid cost function comprises at least two components, one component representing a cost function based upon the CAP signal and the other component representing a cost function based upon the QAM signal.

4. The improvement of claim 3 wherein the hybrid cost function is any combination of either a constant modulus type of algorithm, a reduced constellation type of algorithm, or a multimodulus type of algorithm as applied to the CAP signal and the QAM signal.

5. The improvement of claim 3 wherein one component of the hybrid cost function is used to update values of the tap coefficients more frequently than another component of the hybrid cost function.

6. Apparatus for use in a receiver for blindly equalizing a received signal, where the received signal represents any one of a number of different types of transmission schemes, the apparatus comprising:

an equalizer for blindly equalizing the received signal, the equalizer having associated tap coefficients; and a processor for adapting values of the tap coefficients such that the values are adapted based upon a hybrid cost function.

7. The apparatus of claim 6 wherein the hybrid cost function provides for automatic phase recovery.

8. The apparatus of claim 6 wherein the hybrid cost function comprises n components, each component representing a cost function based upon a different type of transmission scheme, where n>1.

9. The apparatus of claim 8 wherein the hybrid cost function is any combination of either a constant modulus type of algorithm, a reduced constellation type of algorithm, or a multimodulus type of algorithm as applied to the different types of transmission schemes.

10. The apparatus of claim 9 wherein one transmission scheme is a carrierless amplitude modulation/phase modulation (CAP) and another transmission scheme is a quadrature amplitude modulation (QAM).

11. The apparatus of claim 8 wherein one component of the hybrid cost function is used to update values of the tap coefficients more frequently than another component of the hybrid cost function.

12. The apparatus of claim 6 wherein the hybrid cost function comprises two components, one component representing a cost function based upon a carrierless amplitude modulation/phase modulation (CAP) transmission scheme and the other component representing a cost function based upon a quadrature amplitude modulation (QAM) transmission scheme.

13. The apparatus of claim 12 wherein the hybrid cost function is any combination of either a constant modulus type of algorithm, a reduced constellation type of algorithm, or a multimodulus type of algorithm as applied to the CAP transmission scheme and the QAM transmission scheme.

14. The apparatus of claim 12 wherein the QAM related component of the hybrid cost function is used to update values of the tap coefficients more frequently than the CAP related component of the hybrid cost function.

15. The apparatus of claim 12 wherein the CAP related component of the hybrid cost function is used to update values of the tap coefficients more frequently than the QAM related component of the hybrid cost function.

16. Apparatus for use in a receiver for blindly equalizing a received signal, where the received signal represents any one of a number of different types of transmission schemes, the apparatus comprising:

a processor for blindly equalizing the received signal; and a memory for storing values of associated tap coefficients;

wherein the processor adapts values of the tap coefficients based upon a hybrid cost function.

17. The apparatus of claim 16 wherein the hybrid cost function provides for automatic phase recovery.

18. The apparatus of claim 16 wherein the hybrid cost function comprises n components, each component representing a cost function based upon a different type of transmission scheme, where n>1.

19. The apparatus of claim 18 wherein the hybrid cost function is any combination of either a constant modulus type of algorithm, a reduced constellation type of algorithm, or a multimodulus type of algorithm as applied to the different types of transmission schemes.

20. The apparatus of claim 19 wherein one transmission scheme is a carrierless amplitude modulation/phase modulation (CAP) and another transmission scheme is a quadrature amplitude modulation (QAM).

21. The apparatus of claim 18 wherein one component of the hybrid cost function is used to update values of the tap coefficients more frequently than another component of the hybrid cost function.

22. The apparatus of claim 16 wherein the hybrid cost function comprises two components, one component representing a cost function based upon a carrierless amplitude modulation/phase modulation (CAP) transmission scheme and the other component representing a cost function based upon a quadrature amplitude modulation (QAM) transmission scheme.

23. The apparatus of claim 22 wherein the hybrid cost function is any combination of either a constant modulus type of algorithm, a reduced constellation type of algorithm, or a multimodulus type of algorithm as applied to the CAP transmission scheme and the QAM transmission scheme.

24. The apparatus of claim 22 wherein the QAM related component of the hybrid cost function is used to update values of the tap coefficients more frequently than the CAP related component of the hybrid cost function.

25. The apparatus of claim 22 wherein the CAP related component of the hybrid cost function is used to update values of the tap coefficients more frequently than the QAM related component of the hybrid cost function.

26. Apparatus for use in a receiver for blindly equalizing a received signal, where the received signal represents any one of a number of different types of transmission schemes, the apparatus comprising:

a processor for blindly equalizing the received signal; and
a memory for storing values of associated tap coefficients;
wherein the processor adapts values of the tap coefficients by alternating between components of a cost function.

27. The apparatus of claim 26 wherein the cost function provides for automatic phase recovery.

28. The apparatus of claim 26 wherein the cost function comprises n components, each component representing a cost function based upon a different type of transmission scheme, where n>1.

29. The apparatus of claim 28 wherein the cost function is any combination of either a constant modulus type of algorithm, a reduced constellation type of algorithm, or a multimodulus type of algorithm as applied to the different types of transmission schemes.

30. The apparatus of claim 29 wherein one transmission scheme is a carrierless amplitude modulation/phase modulation (CAP) and another transmission scheme is a quadrature amplitude modulation (QAM).

31. The apparatus of claim 28 wherein one component of the cost function is used to update values of the tap coefficients more frequently than another component of the cost function.

32. The apparatus of claim 26 wherein the cost function is a hybrid cost function and comprises two components, one component representing a cost function based upon a carrierless amplitude modulation/phase modulation (CAP) transmission scheme and the other component representing a cost function based upon a quadrature amplitude modulation (QAM) transmission scheme.

33. The apparatus of claim 32 wherein the hybrid cost function is any combination of either a constant modulus type of algorithm, a reduced constellation type of algorithm, or a multimodulus type of algorithm as applied to the CAP transmission scheme and the QAM transmission scheme.

34. The apparatus of claim 32 wherein the QAM related component of the hybrid cost function is used to update values of the tap coefficients more frequently than the CAP related component of the hybrid cost function.

35. The apparatus of claim 32 wherein the CAP related component of the hybrid cost function is used to update values of the tap coefficients more frequently than the QAM related component of the hybrid cost function.

36. Apparatus for use in a receiver for blindly equalizing a received signal, where the received signal represents any one of a number of different types of transmission schemes, the apparatus comprising:
an equalizer for blindly equalizing the received signal, the equalizer having associated tap coefficients; and
a processor for adapting values of the tap coefficients by alternating between components of a cost function.

37. The apparatus of claim 36 wherein the cost function provides for automatic phase recovery.

38. The apparatus of claim 36 wherein the cost function comprises n components, each component representing a cost function based upon a different type of transmission scheme, where n>1.

39. The apparatus of claim 38 wherein the cost function is any combination of either a constant modulus type of algorithm, a reduced constellation type of algorithm, or a multimodulus type of algorithm as applied to the different types of transmission schemes.

40. The apparatus of claim 39 wherein one transmission scheme is a carrierless amplitude modulation/phase modulation (CAP) and another transmission scheme is a quadrature amplitude modulation (QAM).

41. The apparatus of claim 39 wherein one component of the cost function is used to update values of the tap coefficients more frequently than another component of the cost function.

42. The apparatus of claim 38 wherein the cost function is a hybrid cost function and comprises two components, one component representing a cost function based upon a carrierless amplitude modulation/phase modulation (CAP) transmission scheme and the other component representing a cost function based upon a quadrature amplitude modulation (QAM) transmission scheme.

43. The apparatus of claim 42 wherein the hybrid cost function is any combination of either a constant modulus type of algorithm, a reduced constellation type of algorithm, or a multimodulus type of algorithm as applied to the CAP transmission scheme and the QAM transmission scheme.

44. The apparatus of claim 42 wherein the QAM related component of the hybrid cost function is used to update values of the tap coefficients more frequently than the CAP related component of the hybrid cost function.

45. The apparatus of claim 42 wherein the CAP related component of the hybrid cost function is used to update values of the tap coefficients more frequently than the QAM related component of the hybrid cost function.

46. A method for use in a receiver for blindly equalizing a received signal, the method comprising the steps of:
using an equalizer for blindly equalizing the received signal for providing an equalized signal; and
updating associated tap coefficients of the equalizer as a function of a hybrid cost function.

47. The method of claim 46 wherein the hybrid cost function provides for automatic phase recovery.

48. The method of claim 46 wherein the hybrid cost function comprises n components, each component representing a cost function based upon a different type of transmission scheme, where n>1.

49. The method of claim 48 wherein the hybrid cost function is any combination of either a constant modulus type of algorithm, a reduced constellation type of algorithm, or a multimodulus type of algorithm as applied to the different types of transmission schemes.

50. The method of claim 49 wherein one transmission scheme is a carrierless amplitude modulation/phase modulation (CAP) and another transmission scheme is a quadrature amplitude modulation (QAM).

51. The method of claim 48 wherein one component of the hybrid cost function is used to update values of the tap coefficients more frequently than another component of the hybrid cost function.

52. The method of claim 48 wherein the hybrid cost function comprises two components, one component representing a cost function based upon a carrierless amplitude modulation/phase modulation (CAP) transmission scheme and the other component representing a cost function based upon a quadrature amplitude modulation (QAM) transmission scheme.

53. The method of claim 52 wherein the hybrid cost function is any combination of either a constant modulus type of algorithm, a reduced constellation type of algorithm, or a multimodulus type of algorithm as applied to the CAP transmission scheme and the QAM transmission scheme.

54. The method of claim 52 wherein the QAM related component of the hybrid cost function is used to update values of the tap coefficients more frequently than the CAP related component of the hybrid cost function.

55. The method of claim 52 wherein the CAP related component of the hybrid cost function is used to update values of the tap coefficients more frequently than the QAM related component of the hybrid cost function.

56. The method of claim 46 wherein the received signal represents any one of a number of transmission schemes, the method further comprising the steps of:

performing for each type of transmission scheme a mean square error type of calculation for providing a respective number; and deciding what type of transmission scheme the received signal represents by comparing the respective numbers for each transmission scheme.

57. The method of claim 56 further comprising the step of switching to using a decision-directed mode for updating the associated tap coefficient values after a predetermined amount of time.

58. The method of claim 56 wherein the deciding step includes the step of switching to using a decision-directed mode for updating the associated tap coefficient values.

59. The method of claim 46 wherein the received signal represents any one of a number of transmission schemes, the method further comprising the steps of:

performing for each type of transmission scheme a cost function type of calculation for providing a respective number; and deciding what type of transmission scheme the received signal represents by comparing the respective numbers for each transmission scheme.

60. The method of claim 59 further comprising the step of switching to using a decision-directed mode for updating the associated tap coefficient values after a predetermined amount of time.

61. The method of claim 59 wherein the deciding step includes the step of switching to using a decision-directed mode for updating the associated tap coefficient values.

62. A method for use in a receiver for blindly equalizing a received signal, the method comprising the steps of:

using an equalizer for blindly equalizing the received signal for providing an equalized signal; and updating associated tap coefficients of the equalizer by alternating between components of a cost function.

63. The method of claim 62 wherein the cost function is a hybrid cost function that provides for automatic phase recovery.

64. The method of claim 62 wherein the cost function comprises n components, each component representing a cost function based upon a different type of transmission scheme, where n>1.

65. The method of claim 62 wherein the cost function is any combination of either a constant modulus type of algorithm, a reduced constellation type of algorithm, or a multimodulus type of algorithm as applied to the different types of transmission schemes.

66. The method of claim 65 wherein one transmission scheme is a carrierless amplitude modulation/phase modulation (CAP) and another transmission scheme is a quadrature amplitude modulation (QAM).

67. The method of claim 62 wherein one component of the cost function is used to update values of the tap coefficients more frequently than another component of the cost function.

68. The method of claim 62 wherein the cost function is a hybrid cost function and comprises two components, one component representing a cost function based upon a carrierless amplitude modulation/phase modulation (CAP) transmission scheme and the other component representing a cost function based upon a quadrature amplitude modulation (QAM) transmission scheme.

69. The method of claim 68 wherein the hybrid cost function is any combination of either a constant modulus type of algorithm, a reduced constellation type of algorithm, or a multimodulus type of algorithm as applied to the CAP transmission scheme and the QAM transmission scheme.

70. The method of claim 68 wherein the QAM related component of the hybrid cost function is used to update values of the tap coefficients more frequently than the CAP related component of the hybrid cost function.

71. The method of claim 68 wherein the CAP related component of the hybrid cost function is used to update values of the tap coefficients more frequently than the QAM related component of the hybrid cost function.

72. The method of claim 62 wherein the received signal represents any one of a number of transmission schemes, the method further comprising the steps of:

performing for each type of transmission scheme a mean square error type of calculation for providing a respective number; and deciding what type of transmission scheme the received signal represents by comparing the respective numbers for each transmission scheme.

73. The method of claim 72 further comprising the step of switching to using a decision-directed mode for updating the associated tap coefficient values after a predetermined amount of time.

74. The method of claim 72 wherein the deciding step includes the step of switching to using a decision-directed mode for updating the associated tap coefficient values.

75. The method of claim 62 wherein the received signal represents any one of a number of transmission schemes, the method further comprising the steps of:

performing for each type of transmission scheme a cost function type of calculation for providing a respective number; and deciding what type of transmission scheme the received signal represents by comparing the respective numbers for each transmission scheme.

76. The method of claim 75 further comprising the step of switching to using a decision-directed mode for updating the associated tap coefficient values after a predetermined amount of time.

77. The method of claim 75 wherein the deciding step includes the step of switching to using a decision-directed mode for updating the associated tap coefficient values.

* * * * *